US008684884B2

(12) United States Patent
Kato

(10) Patent No.: US 8,684,884 B2
(45) Date of Patent: Apr. 1, 2014

(54) TRANSMISSION CONTROL DEVICE AND TRANSMISSION CONTROL METHOD

(75) Inventor: Shingo Kato, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/576,914

(22) PCT Filed: Feb. 24, 2011

(86) PCT No.: PCT/JP2011/054127
§ 371 (c)(1),
(2), (4) Date: Aug. 2, 2012

(87) PCT Pub. No.: WO2011/135910
PCT Pub. Date: Nov. 3, 2011

(65) Prior Publication Data
US 2013/0331227 A1    Dec. 12, 2013

(30) Foreign Application Priority Data

Apr. 26, 2010  (JP) .................................. 2010-101319

(51) Int. Cl.
*B60K 1/02* (2006.01)
(52) U.S. Cl.
USPC ................................ 477/3; 903/930; 903/945
(58) Field of Classification Search
USPC ......... 477/3, 7, 15, 37, 43, 98, 115, 173, 174; 903/930, 945
See application file for complete search history.

(56) References Cited

U.S. PATENT DOCUMENTS

2002/0115526 A1* 8/2002 Wakashiro et al. ............... 477/5
2012/0245781 A1* 9/2012 Kanamori et al. ............. 701/22

FOREIGN PATENT DOCUMENTS

| JP | 2002-089594 A | 3/2002 |
| JP | 2005-147312 A | 6/2005 |
| JP | 2010-006290 A | 1/2010 |

* cited by examiner

*Primary Examiner* — Justin Holmes
(74) *Attorney, Agent, or Firm* — Arent Fox LLP

(57) ABSTRACT

A plurality of energy efficiencies of an electric motor which are determined by characteristics of the electric motor are set according to the revolution speed and the driving force of the electric motor, and among the plurality of energy efficiencies, a plurality of energy efficiency groups having the equivalent energy efficiency are prepared. The energy efficiency for each transmission gear of a first input shaft is determined on the basis of a travelling speed and a required driving force of a vehicle. To which group among the plurality of energy efficiency groups that each determined energy efficiency is pertained is determined, and a transmission gear corresponding to the energy efficiency group having the highest energy efficiency among the determined energy efficiency groups is selected.

15 Claims, 4 Drawing Sheets

(a) SELECT THE FIFTH GEAR SPEED HAVING BETTER EFFICIENCY (b) SELECT THE THIRD GEAR SPEED HAVING BETTER EFFICIENCY (c) SINCE THE THIRD GEAR SPEED AND THE FIFTH GEAR SPEED HAVE THE SAME EFFICIENCY, SELECT ON THE BASIS OF THE REQUIRED DRIVING FORCE (a) SELECT THE THIRD GEAR SPEED HAVING A SMALLER CALORIFIC VALUE RESULTED FROM THE COPPER LOSS (b) SELECT THE FIFTH GEAR SPEED HAVING A SMALLER CALORIFIC VALUE RESULTED FROM THE COPPER LOSS

TRANSMISSION CONTROL DEVICE AND TRANSMISSION CONTROL METHOD

CROSS-REFERENCED TO RELATED APPLICATION

This application is a National Stage entry of International Application PCT/JP2011/054127, filed Feb. 24, 2011, which claims priority to Japanese Patent Application No. 2010-10319, filed Apr. 26, 2010, the disclosure of the prior applications are hereby incorporated in its entirety by reference.

TECHNICAL FIELD

The present invention relates to a control device and a control method of a transmission comprised of a dual clutch having two input shafts.

BACKGROUND ART

For example, in Patent document 1 below, there has been disclosed a power transmission mechanism (transmission) comprised of a dual clutch having two input shafts.

In a vehicle equipped with such dual clutch transmission, when a clutch of one input shaft is engaged to transmit a driving force with a transmission gear in a selected state, a clutch of the other input shaft is released with the transmission gear in the selected state. This kind of preliminary transmission gear selection is called as a pre-shift.

CITATION LIST

Patent Documents

Patent document 1: Japanese Patent Laid-open No. 2002-89594

SUMMARY OF INVENTION

Technical Problem

However, in the above-mentioned transmission, the driving force that should output from a driving source with respect to a travelling speed and a required driving force varies according to gear ratios, therefore, it is possible that the energy loss of the driving source is increased according to a selected transmission gear in the pre-shift, which consequently deteriorates the fuel efficiency.

Particularly in a hybrid vehicle equipped with an electric motor (motor) and an internal combustion engine (engine) as the driving source, the energy loss resulted from a revolution speed and the required driving force in the engine is different from that in the motor. Therefore, in performing the pre-shift on the input shaft coupled with the motor, when the vehicle is travelling by the driving force input from the input shaft decoupled from the motor, it is possible to reduce the energy loss of the motor by selecting a transmission gear so as to inhibit the deterioration of the fuel efficiency.

The present invention has been accomplished in view of the aforementioned problems, and it is therefore an object of the present invention to provide a transmission control device and a transmission control method capable of selecting a transmission gear to reduce energy loss of an electric motor in a pre-shift during the travelling by an input shaft coupled with an internal combustion engine only.

Solution to Problem

A first aspect of the present invention provides a transmission control device of a hybrid vehicle equipped with an internal combustion engine and an electric motor as a driving source. The transmission control device of the present invention comprises: a transmission configured to perform a gear-change on a driving force input from the internal combustion engine and the electric motor and output the changed driving force, and a control unit configured to control the transmission, the transmission is configured to include a first input shaft which is input with the driving force from the electric motor and the driving force from the internal combustion engine via a first switching unit, and has at least two transmission gears; a second input shaft which is input with the driving force from the internal combustion engine via a second switching unit and has at least one transmission gear; a first selection unit configured to select a transmission gear of the first input shaft; a second selection unit configured to select a transmission gear of the second input shaft; and an output shaft coupled with the first input shaft or the second input shaft via the first selection unit or the second selection unit, and the transmission is configured to perform the gear-change on the driving force input from the first input shaft or the second input shaft and output it from the output shaft through the selection of the transmission gear by the first selection unit or the second selection unit, respectively, under a condition that the first switching unit or the second switching unit is in a coupled state, a plurality of ratios which are determined by characteristics of the electric motor according to a revolution speed and the driving force of the electric motor and obtained by dividing an output energy of the electric motor by an input energy thereof are set, and a plurality of ratio groups having the equivalent ratio among the plurality of ratios are prepared preliminarily, under a condition that the first switching unit is in a decoupled state, the second switching unit is in a coupled state and a transmission gear is selected by the second selection unit to input the driving force from the internal combustion engine to the second input shaft, the control unit determines the ratio for each transmission gear of the first input shaft on the basis of a travelling speed and a required driving force of the vehicle, determines to which group among the plurality of ratio groups that each determined ratio is pertained, and selects a transmission gear of the first input shaft corresponding to a ratio group having the highest ratio among the determined ratio groups to which the determined ratio is pertained via the first selection unit.

According to the first aspect of the present invention, a plurality of ratios which are determined by characteristics of the electric motor according to the revolution speed and the driving force of the electric motor and obtained by dividing an output energy of the electric motor by an input energy thereof are set, and a plurality of ratio groups having the equivalent ratio among the plurality of ratios are prepared preliminarily.

The ratio for each transmission gear of the first input shaft is determined on the basis of the travelling speed and the required driving force of the vehicle, to which group among the plurality of ratio groups that each determined ratio is pertained is determined, and a transmission gear of the first input shaft corresponding to a ratio group having the highest ratio among the determined ratio groups to which the determined ratio is pertained is selected via the first selection unit. At this moment, the first switching unit is in the decoupled state, the second switching unit is in the coupled state and a transmission gear is selected by the first selection unit, namely it is in the pre-shift state.

Therefore, in the pre-shift during the travelling by the input shaft coupled with the internal combustion engine only, a transmission gear of the first input shaft having the highest energy efficiency is selected on the basis of the travelling speed and the required driving force at the present, it is possible to reduce the energy loss of the electric motor. In the present invention, the meaning of "being equivalent" does not have to be equal, it may be deemed as being equivalent even if some width is present about a value.

In the first aspect of the present invention, it is preferable that under a condition that the transmission gear of the first input shaft corresponding to the ratio group having the highest ratio among the determined ratio groups to which the determined ratio is pertained is present in plural number, the control unit selects a transmission gear of the first input shaft via the first selection unit according to the required driving force. According thereto, when the transmission gear of the first input shaft is present in plural number in the ratio group having the highest ratio among the determined ratio groups to which the determined ratio is pertained, a transmission gear of the first input shaft is selected by the first selection unit according to the required driving force. Therefore, it is possible to select a transmission gear to reduce the energy loss of the electric motor without decreasing the required driving force.

A second aspect of the present invention provides a transmission control device of a hybrid vehicle equipped with an internal combustion engine and an electric motor as a driving source. The transmission control device of the present invention comprises: a transmission configured to perform a gear-change on a driving force input from the internal combustion engine and the electric motor and output the changed driving force, and a control unit configured to control the transmission, the transmission is configured to include a first input shaft which is input with the driving force from the electric motor and the driving force from the internal combustion engine via a first switching unit, and has at least two transmission gears; a second input shaft which is input with the driving force from the internal combustion engine via a second switching unit and has at least one transmission gear; a first selection unit configured to select a transmission gear of the first input shaft; a second selection unit configured to select a transmission gear of the second input shaft; and an output shaft coupled with the first input shaft or the second input shaft via the first selection unit or the second selection unit, and the transmission is configured to perform the gear-change on the driving force input from the first input shaft or the second input shaft and output it from the output shaft through the selection of the transmission gear by the first selection unit or the second selection unit, respectively, under a condition that the first switching unit or the second switching unit is in a coupled state, a plurality of calorific values of the electric motor which are determined by characteristics of the electric motor according to a revolution speed and the driving force of the electric motor are set, and a plurality of calorific value groups having the equivalent calorific value among the plurality of calorific values are prepared preliminarily, under a condition that the first switching unit is in a decoupled state, the second switching unit is in a coupled state and a transmission gear is selected by the second selection unit to input the driving force from the internal combustion engine to the second input shaft, the control unit determines the calorific value for each transmission gear of the first input shaft on the basis of a travelling speed and a required driving force of the vehicle, determines to which group among the plurality of calorific value groups that each determined calorific value is pertained, and selects a transmission gear of the first input shaft corresponding to a calorific value group having the smallest calorific value among the determined calorific value groups to which the determined calorific value is pertained via the first selection unit.

According to the second aspect of the present invention, a plurality of calorific values of the electric motor which are determined by characteristics of the electric motor according to the revolution speed and the driving force of the electric motor are set, and a plurality of calorific value groups having the equivalent calorific value among the plurality of calorific values are prepared preliminarily.

The calorific value for each transmission gear of the first input shaft is determined on the basis of the travelling speed and the required driving force of the vehicle. To which group among the plurality of calorific value groups that each determined calorific value is pertained is determined, and a transmission gear of the first input shaft corresponding to a calorific value group having the smallest calorific value among the determined calorific value groups to which the determined calorific value is pertained is selected via the first selection unit. When the transmission gear of the first input shaft is selected, the first switching unit is in the decoupled state, the second switching unit is in the coupled state and the transmission gear is selected by the first selection unit, namely it is in the pre-shift state.

As the temperature increases due to heat release, the magnetic force of magnets inside the electric motor weakens, which causes an output torque of the electric motor to drop down. Thus, in order to inhibit the reduction of the driving force, it is necessary to input a greater energy to the electric motor. In the case of travelling at the same speed, the energy loss of the electric motor becomes greater. Therefore, in the pre-shift during the travelling by the input shaft coupled with the internal combustion engine only, it is possible to reduce the energy loss of the electric motor by selecting a transmission gear to decrease the calorific value of the electric motor.

In the second aspect of the present invention, it is preferable that under a condition that the transmission gear of the first input shaft corresponding to the calorific value group having the smallest calorific value among the determined calorific value groups to which the determined calorific value is pertained is present in plural number, the control unit selects a transmission gear of the first input shaft via the first selection unit according to the required driving force. According thereto, when the transmission gear of the first input shaft is present in plural number in the calorific value group having the smallest calorific value among the determined calorific value groups to which the determined calorific value is pertained, a transmission gear of the first input shaft is selected by the first selection unit according to the required driving force. Therefore, it is possible to select a transmission gear to reduce the calorific value of the electric motor without decreasing the required driving force.

A third aspect of the present invention provides a transmission control device of a hybrid vehicle equipped with an internal combustion engine and an electric motor as a driving source. The transmission control device of the present invention comprises: a transmission configured to perform a gear-change on a driving force input from the internal combustion engine and the electric motor and output the changed driving force, a control unit configured to control the transmission, and a temperature detection unit configured to detect a temperature of the electric motor, the transmission is configured to include a first input shaft which is input with the driving force from the electric motor the driving force from the internal combustion engine via a first switching unit, and has at least two transmission gears; a second input shaft which is input with the driving force from the internal combustion engine via a second switching unit and has at least one transmission gear; a first selection unit configured to select a transmission gear of the first input shaft; a second selection unit configured to select a transmission gear of the second input shaft; and an output shaft coupled with the first input shaft or the second input shaft via the first selection unit or the second selection unit, and the transmission is configured to perform the gear-change on the driving force input from the first input shaft or the second input shaft and output it from the output shaft through the selection of the transmission gear by the first selection unit or the second selection unit, respectively, under a condition that the first switching unit or the second switching unit is in a coupled state, a plurality of ratios which are determined by characteristics of the electric motor according to a revolution speed and the driving force of the electric motor and obtained by dividing an output energy of the electric motor by an input energy thereof are set, and a plurality of ratio groups having the equivalent ratio among the plurality of ratios are prepared preliminarily, and a plurality of calorific values of the electric motor which are determined by characteristics of the electric motor according to a revolution speed and the driving force of the electric motor are set, and a plurality of calorific value groups having the equivalent calorific value among the plurality of calorific values are prepared preliminarily, under a condition that the first switching unit is in a decoupled state, the second switching unit is in a coupled state and a transmission gear is selected by the second selection unit to input the driving force from the internal combustion engine to the second input shaft, if the temperature detected by the temperature detection unit is equal to or greater than a predetermined temperature, the control unit determines the calorific value for each transmission gear of the first input shaft on the basis of a travelling speed and a required driving force of the vehicle, determines to which group among the plurality of calorific value groups that each determined calorific value is pertained, and selects a transmission gear of the first input shaft corresponding to a calorific value group having the smallest calorific value among the determined calorific value groups to which the determined calorific value is pertained via the first selection unit; if the temperature detected by the temperature detection unit is less than the predetermined temperature, the control unit determines the ratio for each transmission gear of the first input shaft on the basis of the travelling speed and the required driving force of the vehicle, determines to which group among the plurality of ratio groups that each determined ratio is pertained, and selects a transmission gear of the first input shaft corresponding to a ratio group having the highest ratio among the determined ratio groups to which the determined ratio is pertained via the first selection unit.

According to the third aspect of the present invention, a plurality of ratios which are determined by characteristics of the electric motor according to the revolution speed and the driving force of the electric motor and obtained by dividing an output energy of the electric motor by an input energy thereof are set, and a plurality of ratio groups having the equivalent ratio among the plurality of ratios are prepared preliminarily; moreover, a plurality of calorific values of the electric motor which are determined by characteristics of the electric motor according to the revolution speed and the driving force of the electric motor are set, and a plurality of calorific value groups having the equivalent calorific value among the plurality of calorific values are prepared preliminarily.

If the temperature detected by the temperature detection unit is equal to or greater than the predetermined temperature, the calorific value for each transmission gear of the first input shaft is determined on the basis of a travelling speed and a required driving force of the vehicle. To which group among the plurality of calorific value groups that each determined calorific value is pertained is determined, and a transmission gear of the first input shaft corresponding to a calorific value group having the smallest calorific value among the determined calorific value groups to which the determined calorific value is pertained is selected via the first selection unit.

If the temperature detected by the temperature detection unit is less than the predetermined temperature, the ratio for each transmission gear of the first input shaft is determined on the basis of the travelling speed and the required driving force of the vehicle. To which group among the plurality of ratio groups that each determined ratio is pertained is determined, and a transmission gear of the first input shaft corresponding to a ratio group having the highest ratio among the determined ratio groups to which the determined ratio is pertained is selected via the first selection unit.

When the transmission gear of the first input shaft is selected, the first switching unit is in the decoupled state, the second switching unit is in the coupled state and the transmission gear is selected by the first selection unit, namely it is in the pre-shift state.

Therefore, in the pre-shift during the travelling by the input shaft coupled with the internal combustion engine only, when the temperature of the electric motor is equal to or greater than the predetermined temperature, namely when the energy loss of the a electric motor becomes greater due to the heat release, it is possible to reduce the energy loss of the electric motor by selecting a transmission gear to decrease the calorific value. Further, if the temperature of the electric motor is less than the predetermined temperature, the transmission gear is selected according to a ratio. Therefore, it is possible to reduce the energy loss of the electric motor.

In the third aspect of the present invention, it is preferable that under a condition that the transmission gear of the first input shaft corresponding to the ratio group having the highest ratio among the determined ratio groups to which the determined ratio is pertained is present in plural number, the control unit selects a transmission gear of the first input shaft via the first selection unit according to the required driving force. According thereto, when the transmission gear of the first input shaft is present in plural number in the ratio group having the highest ratio among the determined ratio groups to which the determined ratio is pertained, a transmission gear of the first input shaft is selected by the first selection unit according to the required driving force. Therefore, it is possible to select a transmission gear to reduce the energy loss of the electric motor without decreasing the required driving force.

In the third aspect of the present invention, it is preferable that under a condition that the transmission gear of the first input shaft corresponding to the calorific value group having the smallest calorific value among the determined calorific value groups to which the determined calorific value is pertained is present in plural number, the control unit selects a transmission gear of the first input shaft via the first selection unit according to the required driving force. According thereto, when the transmission gear of the first input shaft is present in plural number in the calorific value group having the smallest calorific value among the determined calorific value groups to which the determined calorific value is pertained, a transmission gear of the first input shaft is selected by the first selection unit according to the required driving force. Therefore, it is possible to select a transmission gear to reduce the calorific value of the electric motor without decreasing the required driving force.

A fourth aspect of the present invention provides a transmission control device of a hybrid vehicle equipped with an internal combustion engine and an electric motor as a driving source. The transmission control device of the present invention comprises: a transmission configured to perform a gear-change on a driving force input from the internal combustion engine and the electric motor and output the changed driving force, a control unit configured to control the transmission, a temperature detection unit configured to detect a temperature of the electric motor, and a request determination unit configured to determine whether or not the driving force is requested by the vehicle, the transmission is configured to include a first input shaft which is input with the driving force from the electric motor and the driving force from the internal combustion engine via a first switching unit, and has at least two transmission gears; a second input shaft which is input with the driving force from the internal combustion engine via a second switching unit and has at least one transmission gear; a first selection unit configured to select a transmission gear of the first input shaft; a second selection unit configured to select a transmission gear of the second input shaft; and an output shaft coupled with the first input shaft or the second input shaft via the first selection unit or the second selection unit, and the transmission is configured to perform the gear-change on the driving force input from the first input shaft or the second input shaft and output it from the output shaft through the selection the selection of the transmission gear by the first selection unit or the second selection unit, respectively, under a condition that the first switching unit or the second switching unit is in a coupled state, a plurality of ratios which are determined by characteristics of the electric motor according to a revolution speed and the driving force of the electric motor and obtained by dividing an output energy of the electric motor by an input energy thereof are set, and a plurality of ratio groups having the equivalent ratio among the plurality of ratios are prepared preliminarily, and a plurality of calorific values of the electric motor which are determined by characteristics of the electric motor according to a revolution speed and the driving force of the electric motor are set, and a plurality of calorific value groups having the equivalent calorific value among the plurality of calorific values are prepared preliminarily, under a condition that the first switching unit is in a decoupled state, the second switching unit is in a coupled state and a transmission gear is selected by the second selection unit to input the driving force from the internal combustion engine to the second input shaft, if it is determined by the request determination unit that the driving force is requested, the control unit selects a transmission gear for the first input shaft via the first selection unit according to the required driving force, if the temperature detected by the temperature detection unit is equal to or greater than a predetermined temperature, the control unit determines the calorific value for each transmission gear of the first input shaft on the basis of a travelling speed and a required driving force of the vehicle, determines to which group among the plurality of calorific value groups that each determined calorific value is pertained, and selects a transmission gear of the first input shaft corresponding to a calorific value group having the smallest calorific value among the determined calorific value groups to which the determined calorific value is pertained via the first selection unit; if the temperature detected by the temperature detection unit is less than the predetermined temperature, the control unit determines the ratio for each transmission gear of the first input shaft on the basis of the travelling speed and the required driving force of the vehicle, determines to which group among the plurality of ratio groups that each determined ratio is pertained, and selects a transmission gear of the first input shaft corresponding to a ratio group having the highest ratio among the determined ratio groups to which the determined ratio is pertained via the first selection unit.

According to the fourth aspect of the present invention, a plurality of ratios which are determined by characteristics of the electric motor according to the revolution speed and the driving force of the electric motor and obtained by dividing an output energy of the electric motor by an input energy thereof are set, and a plurality of ratio groups having the equivalent ratio among the plurality of ratios are prepared preliminarily; moreover, a plurality of calorific values of the electric motor which are determined by characteristics of the electric motor according to the revolution speed and the driving force of the electric motor are set, and a plurality of calorific value groups having the equivalent calorific value among the plurality of calorific values are prepared preliminarily.

If it is determined by the request determination unit that the driving force is requested, a transmission gear for the first input shaft is selected via the first selection unit according to the required driving force. According thereto, when the driving force is requested by the vehicle, it is possible to meet the request so as to improve the convenience of the driver.

If it is determined by the request determination unit that the driving force is not requested, and if the temperature detected by the temperature detection unit is equal to or greater than a predetermined temperature, the calorific value for each transmission gear of the first input shaft is determined on the basis of a travelling speed and a required driving force. To which group among the plurality of calorific value groups that each determined calorific value is pertained is determined, and a transmission gear of the first input shaft corresponding to a calorific value group having the smallest calorific value among the determined calorific value groups to which the determined calorific value is pertained is selected via the first selection unit.

If the temperature detected by the temperature detection unit is less than the predetermined temperature, the ratio for each transmission gear of the first input shaft is determined on the basis of the travelling speed and the required driving force. To which group among the plurality of ratio groups that each determined ratio is pertained is determined, and a transmission gear of the first input shaft corresponding to a ratio group having the highest ratio among the determined ratio groups to which the determined ratio is pertained is selected via the first selection unit.

When the transmission gear of the first input shaft is selected, the first switching unit is in the decoupled state, the second switching unit is in the coupled state and the transmission gear is selected by the first selection unit, namely it is in the pre-shift state.

Therefore, in the pre-shift during the travelling by the input shaft coupled with the internal combustion engine only, as the temperature of the electric motor is equal to or greater than the predetermined temperature, a transmission gear is selected to reduce the calorific value; as the temperature of the electric motor is less than the predetermined temperature, a transmission gear is selected to reduce the energy loss of the electric motor. Further, as the driving force is requested, it is possible to select a transmission gear without decreasing the required driving force, thereby to improve the convenience of the driver.

In the fourth aspect of the present invention, it is preferable that under a condition that the transmission gear of the first input shaft corresponding to the ratio group having the highest ratio among the determined ratio groups to which the determined ratio is pertained is present in plural number, the control unit selects a transmission gear of the first input shaft via the first selection unit according to the is required driving force. According thereto, when the transmission gear of the first input shaft is present in plural number in the ratio group having the highest ratio among the determined ratio groups to which the determined ratio is pertained, a transmission gear of the first input shaft is selected by the first selection unit according to the required driving force. Therefore, it is possible to select a transmission gear to reduce the energy loss of the electric motor without decreasing the required driving force.

In the fourth aspect of the present invention, it is preferable that under a condition that the transmission gear of the first input shaft corresponding to the calorific value group having the smallest calorific value among the determined calorific value groups to which the determined calorific value is pertained is present in plural number, the control unit selects a transmission gear of the first input shaft via the first selection unit according to the required driving force. According thereto, when the transmission gear of the first input shaft is present in plural number in the calorific value group having the smallest calorific value among the determined calorific value groups to which the determined calorific value is pertained, a transmission gear of the first input shaft is selected by the first selection unit according to the required driving force. Therefore, it is possible to select a transmission gear to reduce the calorific value of the electric motor without decreasing the required driving force.

In the fourth aspect of the present invention, it is preferable that the request determination unit determines that the driving force is requested if the required driving force is equal to or greater than a predetermined value. According thereto, when the required driving force is equal to or greater than the predetermined value, it is determined that the driving force is requested; therefore, it is possible to select a transmission gear without decreasing the required driving force where necessary.

In the fourth aspect of the present invention, it is preferable that a setting unit configured to set whether or not to emphasize the driving force is further included, and the request determination unit determines that the driving force is requested if the setting unit is set to emphasize the driving force. According thereto, as the setting unit is set to emphasize the driving force, it is determined that the driving force is requested; therefore, it is possible to select a transmission gear without decreasing the required driving force where necessary.

A fifth aspect of the present invention provides a transmission control method for a hybrid vehicle equipped with an internal combustion engine and an electric motor as a driving source. The transmission is configured to include a first input shaft which is input with the driving force from the electric motor and the driving force from the internal combustion engine via a first switching unit, and has at least two transmission gears; a second input shaft which is input with the driving force from the internal combustion engine via a second switching unit and has at least one transmission gear; a first selection unit configured to select a transmission gear of the first input shaft; a second selection unit configured to select a transmission gear of the second input shaft; and an output shaft coupled with the first input shaft or the second input shaft via the first selection unit or the second selection unit, and the transmission is configured to perform the gear-change on the driving force input from the first input shaft or the second input shaft and output it from the output shaft thr the output shaft through the selection of the transmission gear by the first selection unit or the second selection unit, respectively, under a condition that the first switching unit or the second switching unit is in a coupled state, a plurality of ratios which are determined by characteristics of the electric motor according to a revolution speed and the driving force of the electric motor and obtained by dividing an output energy of the electric motor by an input energy thereof being set, and a plurality of ratio groups having the equivalent ratio among the plurality of ratios being prepared preliminarily. The transmission control method includes a determination step of determining whether or not a transmission gear is selected by the second selection unit to input the driving force from the internal combustion engine to the second input shaft under a condition that the first switching unit is in a decoupled state and the second switching unit is in the coupled state, and a ratio selection step of determining the ratio for each transmission gear of the first input shaft on the basis of a travelling speed and a required driving force of the vehicle, determining to which group among the plurality of ratio groups that each determined ratio is pertained, and selecting a transmission gear of the first input shaft corresponding to a ratio group having the highest ratio among the determined ratio groups to which the determined ratio is pertained if the determination result in the determination step is affirmative.

According to the fifth aspect of the present invention, a plurality of ratios which are determined by characteristics of the electric motor according to the revolution speed and the driving force of the electric motor and obtained by dividing an output energy of the electric motor by an input energy thereof are set, and a plurality of ratio groups having the equivalent ratio among the plurality of ratios are prepared preliminarily.

Whether or not the driving force from the internal combustion engine is input to the second input shaft is determined by the determination step. If it is determined that the driving force from the internal combustion engine is input to the second input shaft, the ratio for each transmission gear of the first input shaft on the basis of a travelling speed and a required driving force, to which group among the plurality of ratio groups that each determined ratio is pertained is determined and a transmission gear of the first input shaft corresponding to a ratio group having the highest ratio among the determined ratio groups to which the determined ratio is pertained is selected via the first selection unit in the ratio selection step. Therefore, in the pre-shift during the travelling by the input shaft coupled with the internal combustion engine only, it is possible to select a transmission gear to reduce the energy loss of the electric motor.

A sixth aspect of the present invention provides a transmission control method for a hybrid vehicle equipped with an internal combustion engine and an electric motor as a driving source. The transmission is configured to include a first input shaft which is input with the driving force from the electric motor and the driving force from the internal combustion engine via a first switching unit, and has at least two transmission gears; a second input shaft which is input with the driving force from the internal combustion engine via a second switching unit and has at least one transmission gear; a first selection unit configured to select a transmission gear of the first input shaft; a second selection unit configured to select a transmission gear of the second input shaft; and an output shaft coupled with the first input shaft or the second input shaft via the first selection unit or the second selection unit, and the transmission is configured to perform the gear-change on the driving force input from the first input shaft or the second input shaft and output it from the output shaft through the selection of the transmission gear by the first selection unit or the second selection unit, respectively, under a condition that the first switching unit or the second switching unit is in a coupled state, a plurality of calorific values of the electric motor which are determined by characteristics of the electric motor according to a revolution speed and the driving force of the electric motor being set, and a plurality of calorific value groups having the equivalent calorific value among the plurality of calorific values being prepared preliminarily. The transmission control method includes a determination step of determining whether or not a transmission gear is selected by the second selection unit to input the driving force from the internal combustion engine to the second input shaft under a condition that the first switching unit is in a decoupled state and the second switching unit is in the coupled state, and a calorific value selection step of determining the calorific value for each transmission gear of the first input shaft on the basis of a travelling speed and a required driving force of the vehicle, determining to which group among the plurality of calorific value groups that each determined calorific value is pertained, and selecting a transmission gear of the first input shaft corresponding to a calorific value group having the smallest calorific value among the determined calorific value groups to which the determined calorific value is pertained via the first selection unit if the determination result in the determination step is affirmative.

According to the sixth aspect of the present invention, a plurality of calorific values of the electric motor which are determined by characteristics of the electric motor according to a revolution speed and the driving force of the electric motor are set, and a plurality of calorific value groups having the equivalent calorific value among the plurality of calorific values are prepared preliminarily.

In the calorific value selection step, the calorific value for each transmission gear of the first input shaft is determined on the basis of a travelling speed and a required driving force of the vehicle, to which group among the plurality of calorific value groups that each determined calorific value is pertained is determined and a transmission gear of the first input shaft corresponding to a calorific value group having the smallest calorific value among the determined calorific value groups to which the determined calorific value is pertained is selected via the first selection unit.

As the temperature increases due to heat release, the magnetic force of magnets inside the electric motor weakens, which causes an output torque of the electric motor to drop down. In order to inhibit the reduction of the driving force, it is necessary to input a greater energy to the electric motor. Therefore, in the pre-shift during the travelling by the input shaft coupled with the internal combustion engine only, it is possible to reduce the energy loss of the electric motor by selecting a transmission gear to decrease the calorific value of the electric motor.

A seventh aspect of the present invention provides a transmission control method for a hybrid vehicle equipped with an internal combustion engine and an electric motor as a driving source. The transmission is configured to include a first input shaft which is input with the driving force from the electric motor and the driving force from the internal combustion engine via a first switching unit, and has at least two transmission gears; a second input shaft which is input with the driving force from the internal combustion engine via a second switching unit and has at least one transmission gear; a first selection unit configured to select a transmission gear of the first input shaft; a second selection unit configured to select a transmission gear of the second input shaft; and an output shaft coupled with the first input shaft or the second input shaft via the first selection unit or the second selection unit, and the transmission is configured to perform the gear-change on the driving force input from the first input shaft or the second input shaft and output it from the output shaft through the selection of the transmission gear by the first selection unit or the second selection unit, respectively, under a condition that the first switching unit or the second switching unit is in a coupled state, a plurality of ratios which are determined by characteristics of the electric motor according to a revolution speed and the driving force of the electric motor and obtained by dividing an output energy of the electric motor by an input energy thereof being set, and a plurality of ratio groups having the equivalent ratio among the plurality of ratios being prepared preliminarily, a plurality of calorific values of the electric motor which are determined by characteristics of the electric motor according to a revolution speed and the driving force of the electric motor being set, and a plurality of calorific value groups having the equivalent calorific value among the plurality of calorific values being prepared preliminarily. The transmission control method includes a determination step of determining whether or not a transmission gear is selected by the second selection unit to input the driving force from the internal combustion engine to the second input shaft under a condition that the first switching unit is in a decoupled state and the second switching unit is in the coupled state, a request determination step of determining whether or not the driving force is requested by the vehicle if the determination result in the determination step is affirmative, a driving force selection step of selecting a transmission gear of the first input shaft via the first selection unit according to the required driving force if the determination result in the request determination step is affirmative, a temperature detection step of detecting a temperature of the electric motor if the determination result in the request determination step is negative, a temperature determination step of determining whether or not the temperature is equal to or greater than a predetermined temperature, a calorific value selection step of determining the calorific value for each transmission gear of the first input shaft on the basis of a travelling speed and a required driving force, determining to which group among the plurality of calorific value groups that each determined calorific value is pertained, and selecting a transmission gear of the first input shaft corresponding to a calorific value group having the smallest calorific value among the determined calorific value groups to which the determined calorific value is pertained via the first selection unit if the determination result in the temperature determination step is affirmative, and a ratio selection step of determining the ratio for each transmission gear of the first input shaft on the basis of a travelling speed and a required driving force of the vehicle, determining to which group among the plurality of ratio groups that each determined ratio is pertained, and selecting a transmission gear of the first input shaft corresponding to a ratio group having the highest ratio among the determined ratio groups to which the determined ratio is pertained via the first selection unit if the determination result in the temperature determination step is negative.

According to the seventh aspect of the present invention, a plurality of ratios which are determined by characteristics of the electric motor according to the revolution speed and the driving force of the electric motor and obtained by dividing an output energy of the electric motor by an input energy thereof are set, and a plurality of ratio groups having the equivalent ratio among the plurality of ratios are prepared preliminarily; moreover, a plurality of calorific values of the electric motor which are determined by characteristics of the electric motor according to the revolution speed and the driving force of the electric motor are set, and a plurality of calorific value groups having the equivalent calorific value among the plurality of calorific values are prepared preliminarily.

Firstly, whether or not the driving force is requested is determined by the request determination step.

If it is determined that the driving force is requested, a transmission gear of the first input shaft is selected via the first selection unit according to the required driving force in the driving force selection step. According thereto, when the driving force is requested by the vehicle, it is possible to meet the request so as to improve the convenience of the driver.

If it is determined that the driving force is not requested, the temperature of the electric motor is detected in the temperature detection step, and whether or not the temperature is equal to or greater than the predetermined temperature is determined in the temperature determination step.

If it is determined that the temperature is equal to or greater than the predetermined temperature, the calorific value for each transmission gear of the first input shaft is determined on the basis of a travelling speed and a required driving force of the vehicle, to which group among the plurality of calorific value groups that each determined calorific value is pertained is determined, and a transmission gear of the first input shaft corresponding to a calorific value group having the smallest calorific value among the determined calorific value groups to which the determined calorific value is pertained is selected via the first selection unit in the calorific value selection step. If it is determined that the temperature is less than the predetermined temperature, the ratio for each transmission gear of the first input shaft is determined on the basis of the travelling speed and the required driving force, to which group among the plurality of ratio groups that each determined ratio is pertained is determined, and a transmission gear of the first input shaft corresponding to a ratio group having the highest ratio among the determined ratio groups to which the determined ratio is pertained is selected via the first selection unit in the ratio selection step.

Therefore, in the pre-shift during the travelling by the input shaft coupled with the internal combustion engine only, as the temperature of the electric motor is equal to or greater than the predetermined temperature, a transmission gear is selected to reduce the calorific value; as the temperature of the electric motor is less than the predetermined temperature, a transmission gear is selected to reduce the energy loss of the electric motor. Further, as the driving force is requested, it is possible to select a transmission gear without decreasing the required driving force, thereby to improve the convenience of the driver.

DESCRIPTION OF EMBODIMENTS

Figure 1:
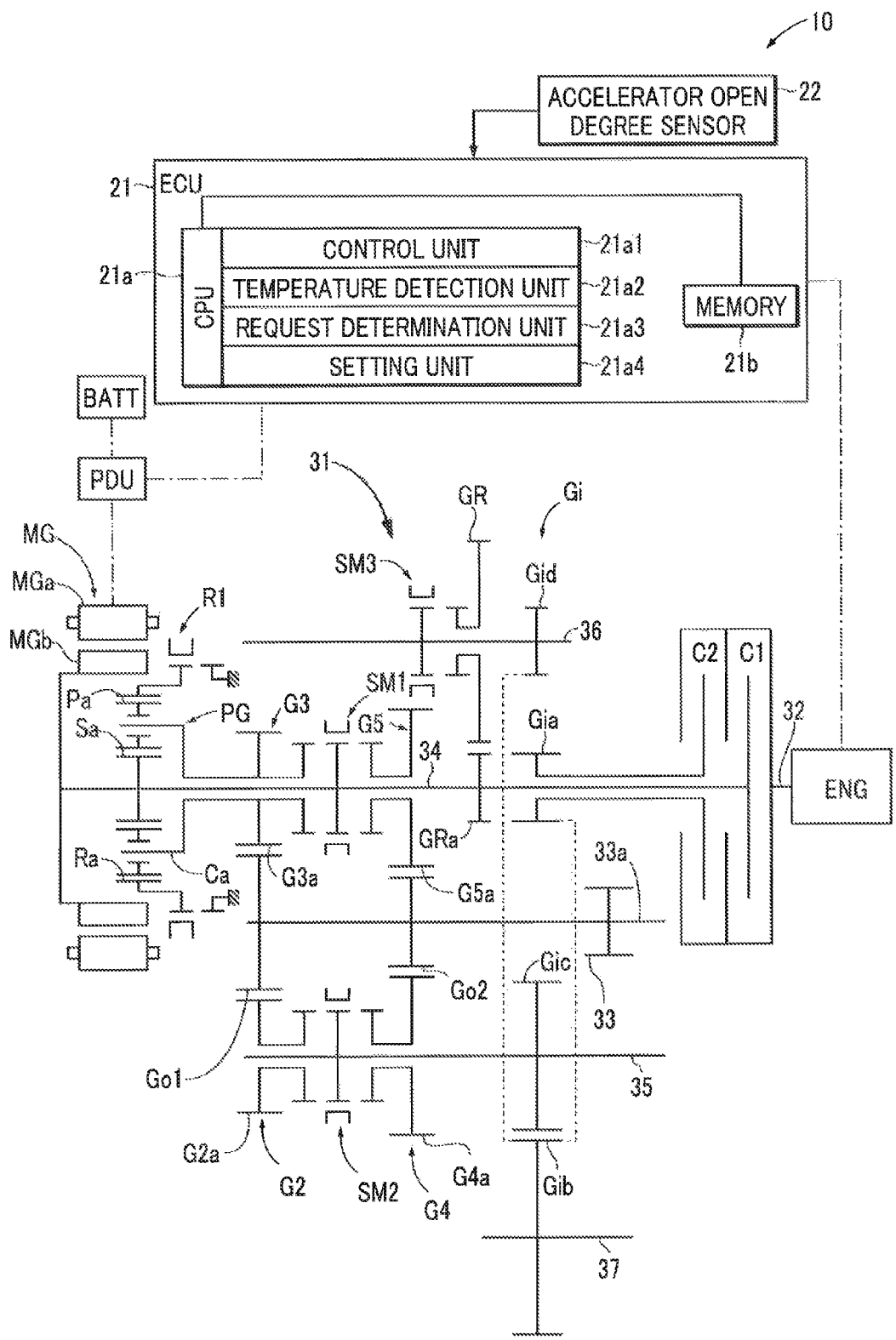
FIG. 1 is a diagram schematically illustrating a configuration of a hybrid vehicle according to an embodiment of the present invention.

FIG. 1 is a diagram schematically illustrating a configuration of a hybrid vehicle according to an embodiment of the present invention. As illustrated in FIG. 1, the hybrid vehicle is equipped with an internal combustion engine ENG, an electric motor (motor) MG, a storage battery BAIT which is a secondary battery for transferring electric power between the motor MG, an automatic transmission 31, and an electronic control device ECU (Electronic Control Unit) 21 configured to separately control the engine ENG, the motor MG and the automatic transmission 31.

The ECU 21 is provided with a CPU 21a for executing various arithmetic processings and a storage device (memory) 21b comprised of a ROM and a RAM for storing various arithmetic programs to be executed in the CPU 21a and storing various tables, arithmetic results and the like, and is configured to input with various electrical signals and output driving signals to the outside on the basis of the arithmetic results and the like.

In the present embodiment, the CPU 21a of the ECU 21 functions as a control unit 21a1, a temperature detection unit 21a request determination unit 21a3, and a setting unit 21a4 in the present invention.

The ECU 21 is supplied with an output signal from an accelerator open degree sensor 22 configured to detect a manipulation amount of an accelerator pedal (not shown). The ECU 21, on the basis of the output signal, determines a required driving force for the vehicle.

The automatic transmission 31 is provided with an engine output shaft 32 to which a driving force (output torque) from the engine ENG is transmitted, an output member 33 composed of output gears for outputting the driving force to front wheels disposed laterally on both sides as driving wheels via a differential gear (not shown), and a plurality of gear trains G2 to G5 having different gear ratios.

The automatic transmission 31 is provided with a first input shaft 34 for pivotally and rotatably supporting driving gears G3a and G5a of odd-numbered gear trains G3 and G5 for establishing odd-numbered gear speeds (transmission gears) respectively in the gear ratio order, a second input shaft 35 for pivotally and rotatably supporting driving gears G2a and G4a of even-numbered gear trains G2 and G4 for establishing even-numbered gear speeds respectively in the gear ratio order, and a reverse shaft 36 for pivotally and rotatably supporting a reverse gear R. The first input shaft 34 is disposed coaxially with the engine output shaft 32, and the second input shaft 35 and the reverse shaft 36 are disposed in parallel to the first input shaft 34.

The automatic transmission 31 is provided with an idle gear train G1 composed of an idle driving gear Gia pivotally and rotatatably supported on the first input shaft 34, a first idle driven gear Gib which is fixed on an idle shaft 37 and is configured to intermesh with the idle driving gear Gia, a second idle driven gear Gic fixed on the second input shaft 35, and a third idle driven gear Gid which is fixed on the reverse shaft 36 and is configured to intermesh with the first idle driving gear Gib. The idle shaft 37 is disposed in parallel to the first input shaft 34.

The automatic transmission 31 is provided with a first clutch C1 and a second clutch C2 comprised of a hydraulically-actuated dry friction clutch or a hydraulically-actuated wet friction clutch. The first clutch C1 is configured to switch freely between a transmission state in which the driving force transmitted from the engine ENG to the engine output shaft 32 can be transmitted to the first input shaft 34 after the transmission ratio is changed and a released state in which the power transmission is disabled. The second clutch C2 is configured to switch freely between a transmission state in which the driving force transmitted from the engine ENG to the engine output shaft 32 can be transmitted to the second input shaft 35 after the transmission ratio is changed and a released state in which the power transmission is disabled. When the second clutch C2 is engaged to achieve the transmission state, the engine output shaft 32 is coupled with the second input shaft 35 via the first idle driving gear Gib and the second idle driving gear Gic. The first clutch C1 is equivalent to the first switching unit in the present invention, and the second clutch C2 is equivalent to the second switching unit in the present invention.

It is preferable that both of the clutches C1 and C2 are actuated by an electric actuator so as to be switched from one state to the other quickly. It is also acceptable that both of the clutches C1 and C2 are actuated by a hydraulic actuator.

The automatic transmission 31 is disposed with a planetary gear mechanism PG which is a differential rotation mechanism located coaxially with the engine output shaft 32. The planetary gear mechanism PG is a single-pinion planetary gear mechanism comprised of a sun gear Sa, a ring gear Ra, and a carrier Ca which rotatably and pivotally supports a pinion Pa intermeshing with the sun gear Sa and the ring gear Ra.

If the three rotation elements, namely the sun gear Sa, the carrier Ca and the ring gear Ra in the planetary gear mechanism PG, are arranged from the side of the sun gear Sa in the order of distances relative to gear ratios in a velocity diagram (a diagram illustrating a relative rotation velocity of each rotation element by a straight line) as a first rotation element, a second rotation element and a third rotation element, then, the sun gear Sa is equivalent to the first rotation element, the carrier Ca is equivalent to the second rotation element and the ring gear Ra is equivalent to the third rotation element.

Herein, if the gear ratio (the number of teeth of the ring gear Ra/the number of teeth of the sun gear Sa) of the planetary gear mechanism PG is set at "g", then, the ratio of a distance between the sun gear Sa which is the first rotation element and the carrier Ca which is the second rotation element to a distance between the carrier Ca which is the second rotation element and the ring gear Ra which is the third rotation element will be g:1.

The sun gear Sa which is the first rotation element is fixed on the first input shaft 34. The carrier Ca which is the second rotation element is coupled with a third speed driving gear G3$a$ in a third speed gear train G3. The ring gear Ra which is the third rotation element is releasably fixed to a stationary member such as the transmission case or the like by a lock mechanism R1.

The lock mechanism R1 is a synchromesh mechanism capable of freely switching the ring gear Ra between a fixed state in which the ring gear Ra is fixed to the stationary member and a released state in which the ring gear Ra can rotate freely.

The lock mechanism R1 is not limited to a synchromesh mechanism, it may be a mechanism which is engaged or released according to friction from a sleeve or the like, a brake such as a wet multi-plate brake, a hub brake, a hand brake or the like, a 1-way clutch, a 2-way clutch or the like. It is acceptable that the planetary gear mechanism PG is a double-pinion planetary gear mechanism comprised of a sun gear, a ring gear and a carrier pivotally supporting a pair of pinions Pa and Pa' which are intermeshing with each other and one pinion is intermeshing with the sun gear and the other one is intermeshing with the ring gear in such a way that the pair of pinions can rotate and revolve freely. In this case, for example, it is acceptable that the sun gear (first rotation element) is fixed on the first input shaft 34, the ring gear (second rotation element) is coupled with the third speed driving gear G3$a$ in the third speed gear train G3, and the carrier (third rotation element) is fixed to the stationary member by the lock mechanism R1.

The motor MG which is hollow inside is disposed outside the planetary gear mechanism PG in the radial direction. In other words, the planetary gear mechanism PG is disposed inside the hollow motor MG. The motor MG is provided with a stator MGa and a rotor MGb.

The motor MG is controlled via a power drive unit PDU on the basis of an instruction signal from the ECU 21. The ECU 21 switches the power drive unit PDU appropriately between a power-running state in which the motor MG is driven by consuming the electric power from the storage battery BATT and a regenerative state in which the rotation torque of the rotor MGb is restrained to generate the electric power which is used to charge the storage battery BATT via the power drive unit PDU.

An output shaft 33$a$, which pivotally supports the output member 33, is fixed with a first driven gear Go1 intermeshing with the second speed driving gear G2$a$ and the third speed driving gear G3$a$. The output shaft 33$a$ is also fixed with a second driven gear Go2 intermeshing with the fourth speed driving gear G4$a$ and the fifth driving gear G5$a$.

As mentioned above, by constructing the driven gears in the second speed gear train G2 and the third speed gear train G3, and the driven gears in the fourth speed gear train G4 and the fifth speed gear train G5 with one gear Go1 and Go2 respectively, it is possible to shorten the shaft length of the automatic transmission, which makes it more convenient to mount the automatic transmission to an FF (Front-Engine Front-Wheel Drive) type vehicle.

The first input shaft 34 is fixed with a reverse driven gear GRa intermeshing with the reverse gear GR.

The first input shaft 34 is disposed with a first intermeshing mechanism SM1 which is comprised of a synchromesh mechanism and serves as a first selection unit configured to freely select any one of a third speed coupled state in which the third speed driving gear G3$a$ is coupled with the first input shaft 34, a fifth speed coupled state in which the fifth speed driving gear G5$a$ is coupled with the first input shaft 34, and a neutral sate in which the third speed driving gear G3$a$ and the fifth speed driving gear G5$a$ are decoupled from the first input shaft 34.

The second input shaft 35 is disposed with a second intermeshing mechanism SM2 which is comprised of a synchromesh mechanism and serves as a second selection unit configured to freely select any one of a second speed coupled state in which the second speed driving gear G2$a$ is coupled with the second input shaft 35, a fourth speed coupled state in which the fourth speed driving gear G4$a$ is coupled with the second input shaft 35, and a neutral sate in which the second speed driving gear G2$a$ and the fourth speed driving gear G4$a$ are decoupled from the second input shaft 35.

The reverse shaft 36 is disposed with a third intermeshing mechanism SM3 which is comprised of a synchromesh mechanism and is configured to freely select any one of a coupled state in which the reverse gear GR is coupled with the reverse shaft 36 and a neutral state in which the reverse gear GR is decoupled from the reverse shaft 36.

Hereinafter, the operations of the automatic transmission 31 having the above-mentioned configuration will be described.

In the automatic transmission 31, the engagement of the first clutch C1 enables the engine ENG to be initiated by using the driving force from the motor MG.

In order to establish a first gear speed by using the driving force from the engine ENG, the ring gear Ra in the planetary gear mechanism PG is locked to the locked state by the lock mechanism R1 and the first clutch C1 is engaged to enable the transmission state.

The driving force of the engine ENG is input to the sun gear Sa in the planetary gear mechanism PG via the engine output shaft 32, the first clutch C1 and the first input shaft 34, and is transmitted to the third speed driving gear G3a via the carrier Ca with the revolution speed of the engine ENG input to the engine output shaft 32 being reduced to $1/(g+1)$.

If the gear ratio (the number of teeth of the third speed driving gear G3a/the number of teeth of the first driven gear Go1) of the third speed gear train G3 comprised of the third speed driving gear G3a and the first driven gear Go1 is set at "i", the driving force transmitted to the third speed driving gear G3a is reduced to $1/i(g+1)$ and output from the output member 33 via the first driven gear Go1 and the output shaft 33a, thereby, the first gear speed is established.

As mentioned above, in the automatic transmission 31, the first gear speed can be established by the planetary gear mechanism PG and the third speed gear train, thereby, it is unnecessary to have a special intermeshing mechanism for establishing the first gear speed, and consequently, it is possible to shorten the shaft length of the automatic transmission.

In the first gear speed, the vehicle is in a deceleration state and the ECU 21 switches the motor MG to a regenerative state and performs a regenerative deceleration running by braking the motor MG according to the capacity residue (State of Charge) SOC of the storage battery BATT. Moreover, according to the SOC of the storage battery BATT, it is possible for the vehicle to perform an HEV (Hybrid Electric Vehicle) travelling in which the motor MG is driven to assist the driving force of the engine ENG, or an EV (Electric Vehicle) travelling in which the vehicle travels by the driving force from the motor MG only.

Further, when the vehicle is in the EV travelling, the deceleration of the vehicle is allowed and the vehicular velocity is equal to or greater than a predetermined velocity, gradual engagement of the first clutch C1 enables the engine ENG to be initiated by using the kinetic energy of the vehicle without using the driving force of the motor MG.

Furthermore, when the ECU 21 predicts that the vehicle travelling at the first gear speed may be shifted up to the second gear speed according to the vehicle information such as the vehicular velocity, the accelerator pedal open degree and the like, is the second intermeshing mechanism SM2 is switched to the second speed coupled state in which the second speed driving gear G2a and the second input shaft 35 are coupled or a pre-shift state nearby the second speed coupled state.

In order to establish the second gear speed by using the driving force of the engine ENG, the lock mechanism R1 is switched to the released state, the second intermeshing mechanism SM2 is switched to the second speed coupled state in which the second speed driving gear G2a and the second input shaft 35 are coupled, and the second clutch C2 is engaged to enable the transmission state. Thereby, the driving force from the engine ENG is output from the output member 33 via the second clutch C2, the idle gear train Gi, the second input shaft 35, the second speed gear train G2 and the output shaft 33a.

In the second gear speed, when the ECU 21 predicts a shift-up in the second gear speed, the first intermeshing mechanism SM1 is switched to the third speed coupled state in which the third speed driving gear G3a and the first input shaft 34 are coupled or a pre-shift state nearby the third speed coupled state.

On the other hand, when the ECU 21 predicts a shift-down in the second gear speed, the first intermeshing mechanism SM1 is switched to the pre-shift state where the first intermeshing mechanism SM1 is switched to the neutral state in which the third speed driving gear G3a and the fifth speed driving gear G5a are decoupled from the first input shaft 34, and the ring gear Ra in the planetary gear mechanism PG is switched to the fixed state by the lock mechanism R1.

Thus, only by switching the first clutch C1 to the transmission state and the second clutch C2 to the released state, it is possible to perform the shift-up or the shift-down so as to change the gear speed smoothly without interrupting the driving force.

In the second gear speed, when the vehicle is in the deceleration state, the ECU 21 performs the regenerative deceleration running according to the capacity residue SOC of the storage battery BATT. However, the regenerative deceleration running performed in the second gear speed is different between the case when the first intermeshing mechanism SM1 is in the third speed coupled state and the case when the first intermeshing mechanism SM1 is in the neutral state.

When the first intermeshing mechanism SM1 is in the third speed coupled state, the first driven gear Go1 is rotated by the second driving gear G2a, the third speed driving gear G3a is rotated by the first driven gear Go1, and the rotor MGb of the motor MG is rotated by the third driving gear G3a via the first input shaft 34; thus, the regeneration is performed to generate the electric power by braking the rotor MGb to restrain the revolution thereof.

On the other hand, when the first intermeshing mechanism SM1 is in the neutral state, the revolution speed of the ring gear Ra is equal to "0" since it is locked to the fixed state by the lock mechanism R1, the regeneration is performed by braking the carrier Ca rotating together with the third speed driving gear G3a which intermeshes with the first driven gear Go1 to make the motor MG which is coupled with the sun gear Sa generate the electric power.

In the HEV travelling at the second gear speed, for example, the first intermeshing mechanism SM1 is switched to the third speed coupled state in which the third speed driving gear G3a and the first input shaft 34 are coupled, the lock mechanism R1 is switched to the released state, thereby, each rotating element in the planetary gear mechanism PG is unable to make relative rotation, and the driving force of the motor MG is transmitted to the output member 33 via the third speed gear train G3, which makes it possible to perform the HEV traveling at the second gear speed. Or alternatively, the first intermeshing mechanism SM1 is switched to the neutral state and the lock mechanism R1 is switched to the fixed state to make the revolution speed of the ring gear Ra equal to "0", thereby, the driving force of the motor MG is transmitted to the first driven gear Go1 via the first gear speed path, which also makes it possible to achieve the HEV travelling at the second gear speed.

In order to establish the third gear speed by using the driving force of the engine ENG, the first intermeshing mechanism SM1 is switched to the third speed coupled state in which the third speed driving gear G3a and the first input shaft 34 are coupled, and the first clutch C1 is engaged to enable the transmission state. Thereby, the driving force of the engine ENG is transmitted to the output member 33 via the engine output shaft 32, the first clutch C1, the first input shaft 34, the first intermeshing mechanism SM1 and the third speed gear train G3, and is output at a revolution speed of $1/i$.

In the third gear speed, since the first intermeshing mechanism SM1 is switched to the third speed coupled state in which the third speed driving gear G3a and the first input shaft 34 are coupled, the sun gear Sa and the carrier Ca in the planetary gear mechanism PG rotate identically.

Thus, when each rotating element of the planetary gear mechanism PG is unable to rotate relatively, the regenerative deceleration is performed at the motor MG if the sun gear Sa is braked, the HEV traveling can be performed if the driving force of the motor MG is transmitted to the sun gear Sa. Moreover, it is possible to release the first clutch C1 to perform the EV travelling by the driving force from the motor MG only.

In the third gear speed, when the ECU 21 predicts a shift-down in the gear speed according to the vehicle information such as the vehicular velocity, the accelerator pedal open degree and the like, the second intermeshing mechanism SM2 is switched to the second speed coupled state in which the second speed driving gear G2a and the second input shaft 35 are coupled or a pre-shift state nearby the second speed coupled state; on the other hand, when the ECU 21 predicts that a shift-up in the gear speed, the second intermeshing mechanism SM2 is switched to the fourth speed coupled state in which the fourth speed driving gear G4a and the second input shaft 35 are coupled or a pre-shift state nearby the fourth speed coupled state.

Thus, only by switching the second clutch C2 to the transmission state and the first clutch C1 to the released state, it is possible to perform the gear change so as to change the gear speed smoothly without interrupting the driving force.

In order to establish the fourth gear speed by using the driving force of the engine ENG, the second intermeshing mechanism SM2 is switched to the fourth speed coupled state in which the fourth speed driving gear G4a and the second input shaft 35 are coupled, and the second clutch C2 is engaged to enable the transmission state.

In the fourth gear speed, when the ECU 21 predicts a shift-down in the gear speed according to the vehicle information, the first intermeshing mechanism SM1 is is switched to the third speed coupled state in which the third speed driving gear G3a and the first input shaft 34 are coupled or a pre-shift state nearby the third speed coupled state.

On the other hand, when the ECU 21 predicts a shift-up in the gear speed according to the vehicle information, the first intermeshing mechanism SM1 is switched to the fifth speed coupled state in which the fifth speed driving gear G5a and the first input shaft 34 are coupled or a pre-shift state nearby the fifth speed coupled state. Thus, only by engaging the first clutch C1 to the transmission state and releasing the second clutch C2 to the released state, it is possible to perform the shift-up or the shift-down so as to change the gear speed smoothly without interrupting the driving force.

In order to achieve the regenerative deceleration or the HEV traveling during the vehicle is running at the fourth gear speed, when the ECU 21 predicts a shift-down in the gear speed, the first intermeshing mechanism SM1 is switched to the third speed coupled state in which the third speed driving gear G3a and the first input shaft 34 are coupled to achieve the regenerative deceleration in the motor MG if the motor MG is braked or to achieve the HEV travelling if the driving force from the motor MG is transmitted.

When the ECU 21 predicts a shift-up in the gear speed, the first intermeshing mechanism SM1 is switched to the fifth speed coupled state in which the fifth speed driving gear G5a and the first input shaft 34 are coupled to achieve the regenerative deceleration if the motor MG is braked or to achieve the HIEV travelling if the driving force from the motor MG is transmitted.

In order to establish the fifth gear speed by using the driving force of the engine ENG, the first intermeshing mechanism SM1 is switched to the fifth speed coupled state in which the fifth speed driving gear GSa and the first input shaft 34 are coupled. In the fifth gear speed, since the first clutch C1 is switched to the transmission state, the engine ENG and the motor MG are directly coupled, therefore if the driving force is output from the motor MG, the HEV travelling is achieved; if the motor MG is braked to generate the electric power, the regenerative deceleration is achieved.

In order to achieve the EV travelling at the fifth gear speed, the first clutch C1 should be switched to the released state. Moreover, in the EV travelling at the fifth gear speed, it is possible to initiate the engine ENG by gradually engaging the first clutch C1.

When the ECU 21 predicts that the vehicle traveling at the fifth gear speed may be shifted down to the fourth gear speed in the travelling according to the vehicle information, the second intermeshing mechanism SM2 is switched to the fourth speed coupled state in which the fourth speed driving gear G4a and the second input shaft 35 are coupled or a pre-shift state nearby the fourth speed coupled state. Thereby, it is possible to shift down to the fourth gear speed smoothly without interrupting the driving force.

In order to establish the reverse gear speed by using the driving force of the engine ENG, the lock mechanism R1 is switched to the fixed state, the third intermeshing mechanism SM3 is switched to the coupled state in which the reverse gear GR and the reverse shaft 36 are coupled, and the second clutch C2 is engaged to enable the transmission state. Thereby, the driving force of the engine output shaft 32 is output from the output member 33 via the second clutch C2, the idle gear train G1, the reverse gear GR, the reverse driven gear GRa, the sun gear Sa, the carrier Ca, the third speed gear train G3 and the output shaft 33a as a rotation to the rearward direction to establish the reverse gear speed.

As above-mentioned, in the present embodiment, the gear speeds on which the driving force of the driving source is transmitted to the first input shaft are the first gear speed, the third gear speed and the fifth gear speed. In the first gear speed, the first intermeshing mechanism SM1 is switched to the neutral state and the lock mechanism R1 is switched to the fixed state. Thereby, the driving force of the driving source is transmitted to the first input shaft via the planetary gear mechanism PG and the third speed gear train G3. Thus, in the case of establishing the first gear speed, the planetary gear mechanism PG and the third speed gear train G3 is included in the transmission gears of the first input shaft in the present invention. In the present embodiment, the lock mechanism R1 is configured to couple the first input shaft and the output shaft in the first gear speed, therefore, the lock mechanism R1 is equivalent to the first selection unit in the present invention.

In the vehicle, a gear speed which will be shifted to the pre-shift state (hereinafter, referred to as a gear speed of the pre-shift) is selected according to the control by the control unit 21a1 of the ECU 21 on the basis of any one of three selection methods including a selection method according to the required driving force, a selection method according to the efficiency of the motor MG, and a selection method according to the calorific value resulted from the copper loss of the motor MG. For example, in the travelling at the fourth gear speed, according to any one of the three selection methods when a shift-up is predicted, the pre-shift to the fifth gear speed is performed (in this case, the fifth gear speed is the gear speed of the pre-shift), and when a shift-down is predicted, the pre-shift to the third gear speed is performed (in this case, the third gear speed is the gear speed of the pre-shift).

Here, the efficiency of the motor MG refers to a ratio of the output energy from the motor MG divided by the input energy thereof. Thus, the closer the efficiency of the motor MG to 1, the smaller the energy loss of the motor MG will be (the efficiency of the motor MG is good). On the contrary, the closer the efficiency of the motor MG to zero, the greater the energy loss of the motor MG will be (the efficiency of the motor MG is bad).

The calorific value resulted from the copper loss of the motor MG refers to the calorific value occurred when an electric current flows in coils (constituting the stator MGa) for generating the magnetic force. In other words, the calorific value resulted from the copper loss of the motor MG refers to the amount of heat generated as a result of conversion from the electric energy to the heat energy by the resistance of the coils.

Hereinafter, the three selection methods mentioned above will be described.

Firstly, the description will be carried out on the selection method of selecting a gear speed of the pre-shift according to the required driving force. The ECU 21 determines the required driving force according to the output signals from the accelerator open degree sensor 22. If the required driving force is increasing, the ECU 21 determines that acceleration is requested, and performs the pre-shift to a gear speed having a greater transmission ratio so as to increase the driving force. For example, in the case of travelling at the fourth gear speed, the third gear speed is selected in the pre-shift.

On the other hand, if the required driving force is decreasing, the ECU 21 determines that deceleration is requested, and performs the pre-shift to a gear speed having a greater transmission ratio so as to decrease the travelling velocity. For example, in the case of travelling at the fourth gear speed, the third gear speed is selected in the pre-shift.

When the required driving force is constant, the ECU 21 determines that a constant velocity travelling at a constant velocity is requested. Thereby, the ECU 21 performs a pre-shift to a gear speed by which the traveling velocity will be stabilized according to the travelling velocity of the vehicle. The travelling velocity will be stabilized by decreasing the transmission ratio as the travelling velocity of the vehicle increases. For example, if the travelling velocity at the fourth gear speed is more stable at the fifth gear speed than at the third gear speed, then, the fifth gear speed will be selected in the pre-shift.

Hereinafter, the selection method of a gear speed of the pre-shift according to the efficiency of the motor MG will be described.

FIGS. 2(a) to 2(c) illustrate examples of maps of the efficiency of the motor MG with respect to the revolution speed and the driving force of the motor MG travelling at the fourth gear speed. The horizontal axis denotes the revolution speed, and the vertical axis denotes the driving force. As the driving force is greater than zero, it denotes the power-running state, and as the driving force is smaller than zero, it denotes the regenerative state.

Figure 2:
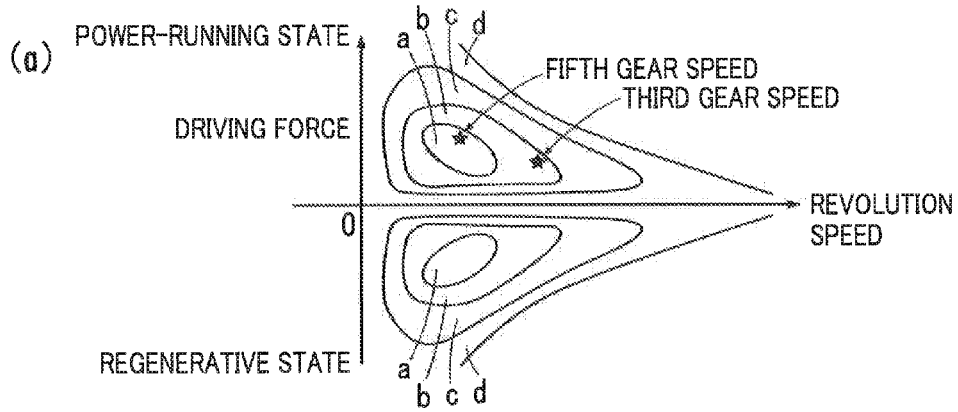
FIG. 2 is a diagram illustrating characteristic examples of an efficiency of a motor MG with respect to a revolution speed and a driving force of the motor MG, (a) representing a case where a fifth gear speed has a better efficiency than a third gear speed, (b) representing a case where the third gear speed has a better efficiency than the fifth gear speed, and (c) representing a case where the third gear speed has the same efficiency as the fifth gear speed.
Figure 2:
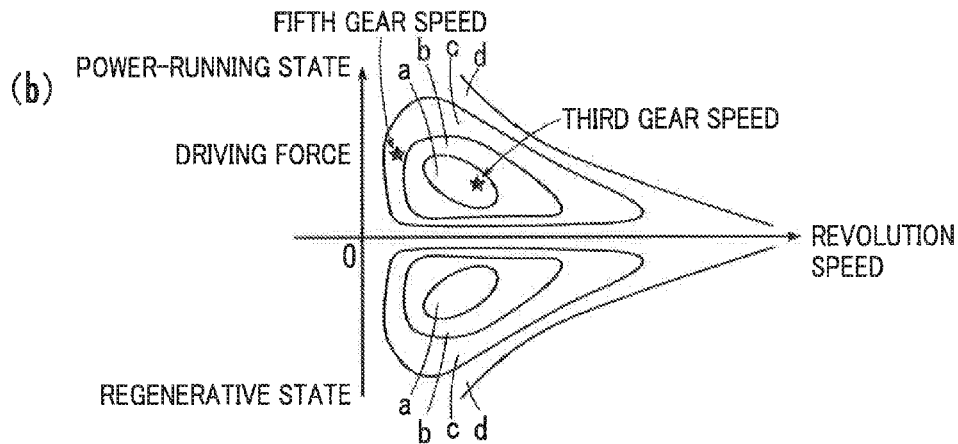
Figure 2:
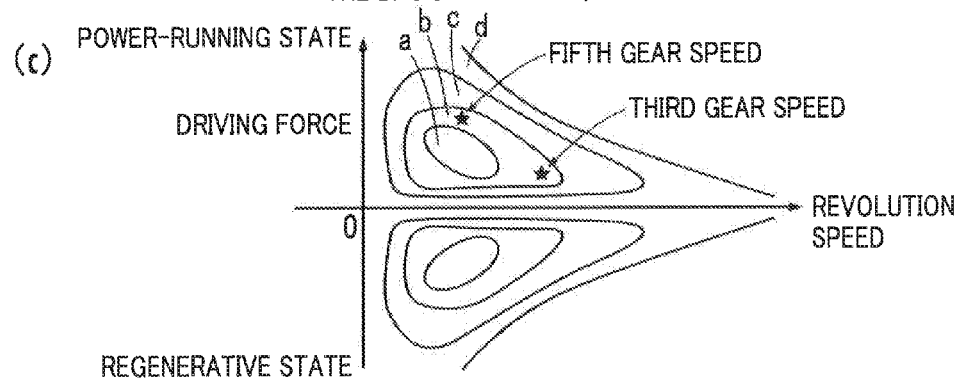

The four regions a, b, c and d illustrated in FIG. 2 denote the distribution of the efficiency of the motor MG. In the same region, the efficiency of the motor MG is equivalent. Equivalent efficiency does not mean that the efficiency has to be equal; it is acceptable that the efficiency is deemed as being equivalent if there is no problem occurred when treated as being equal. The four regions a, b, c and d correspond to the ratio groups in the present invention. The region a has the best efficiency, and the efficiency becomes worse as the region leaves away from the region a. Thereby, in the examples of FIGS. 2(a) to 2(c), the region d has the worst efficiency. The number of the regions is not limited to four; it is acceptable to split the regions where necessary according to characteristics of the efficiency of the motor MG with respect to the revolution speed and the driving force of the motor MG.

The efficiency of the motor MG based on the revolution speed and the driving force of the motor MG is determined by the characteristics of the motor MG, and is stored in the memory 21b of the ECU 21 as a table.

Since the transmission ratio between the wheels of the vehicle and the output member 33 thereof is fixed, the revolution speed of the motor MG at the time of selecting a gear speed of the pre-shift is uniquely determined according to the revolution speed of the wheels of the vehicle (the travelling velocity of the vehicle) and the transmission ratio of the automatic transmission 31.

In the travelling at the second gear speed or at the forth gear speed, the third speed driving gear G3a and the fifth speed driving gear G5a rotates according to the first driven gear Go1 and the second driven gear Go2 fixed on the output shaft 33a. At this moment, by setting the pre-shift state toward the third gear speed or the fifth gear speed, the first input shaft 34 rotates. By setting the pre-shift state toward the first gear speed, since the ring gear Ra is fixed, as the third speed driving gear G3a rotates, the carrier Ca revolves and the sun gear Sa rotates, and the first input shaft 34 rotates.

As above-mentioned, in the travelling at a gear speed (the second gear speed and the fourth gear speed) of the second input shaft, by setting the pre-shift state toward any gear speed (the first gear speed, the third gear speed and the fifth gear speed) of the first input shaft, the first input shaft 34 rotates, accordingly, the rotor MGb of the motor MG rotates. The revolution speed of the rotor MGb is equal to the revolution speed of the motor MG. As mentioned above, the revolution speed is determined according to the travelling velocity of the vehicle and the transmission ratio of the automatic transmission 31.

Therefore, the revolution speed of the motor MG in selecting a gear speed of the pre-shift according to the efficiency of the motor MG is equal to the revolution speed of the motor MG being set to the mentioned pre-shift state. The revolution speed of the motor MG is determined by searching a table with respect to the travelling velocity of the vehicle and the gear speed. The table is stored in the memory 21b. In addition, it is acceptable to calculate the revolution speed of the motor MG from the travelling velocity and the transmission ratio of a gear speed.

The driving force of the motor MG in selecting a gear speed of the pre-shift is determined according to the required driving force related to the manipulated amount of the accelerator pedal in setting the pre-shift state and the transmission ratio of the automatic transmission 31.

The revolution speed of the motor MG becomes greater as the transmission ratio of the automatic transmission 31 becomes greater in relation to the travelling velocity of the vehicle. For example, if travelling at the same velocity, the revolution speed in the case where the third gear speed of the transmission is selected is greater than in the case where the fifth gear speed is selected. Further, if the travelling velocity is the same, the greater the transmission ratio of the automatic transmission 31 is, the smaller the driving force of the motor MG will be. For example, if travelling at the same velocity, the required driving force in the case where the third gear speed of the transmission is selected is smaller than in the case where the fifth gear speed is selected.

FIG. 2(a) illustrates an example in which the fifth gear speed has the efficiency better than the third gear speed. The efficiency at the third gear speed is denoted by the region b, and the efficiency at the fifth gear speed is denoted by the region a. As mentioned above, the region a has a better efficiency than the region b, therefore, the control unit 21a1 performs the pre-shift to select the fifth gear speed having better efficiency.

FIG. 2(b) illustrates an example in which the third gear speed has the efficiency better than the fifth gear speed. The efficiency at the third gear speed is denoted by the region a, and the efficiency at the fifth gear speed is denoted by the region c. In this case, the control unit 21a1 performs the pre-shift to select the third gear speed having a better efficiency.

FIG. 2(c) illustrates an example in which the efficiency at the third gear speed is equivalent to the efficiency at the fifth gear speed, and both are located in the region b. In this case, a gear speed of the pre-shift is selected according to the selection method based on the required driving force as mentioned above. According thereto, it is possible to select the gear speed according to the required driving force as much as possible while reducing the energy loss of the motor MG.

The table of the efficiency of the motor MG with respect to the revolution speed and the driving force of the motor MG, for example, may be varied according to the capacity residue SOC of the storage battery BATT so as to increase the driving force of the engine ENG while decreasing the driving force of the motor MG when the capacity residue SOC of the storage battery BATT is low.

As mentioned above, it is possible to reduce the energy loss of the motor MG and improve the fuel efficiency by selecting the gear speed of the pre-shift according to the efficiency of the motor MG.

Hereinafter, the description will be carried out on the selection method of a gear speed of the pre-shift according to the calorific value resulted from the copper loss of the motor MG.

A magnet possesses such a property that the magnetic force decreases as the temperature thereof increases. Therefore, as the temperature increases due to heat release, the magnetic force of the magnets in the rotor MGb for rotating the rotation shaft (the first input shaft 34) of the motor MG weakens, consequently, the driving force available from the motor MG decreases. In order to inhibit the decrement of the driving force, it is necessary to input a greater energy to the electric motor; however as a result thereof, the energy loss becomes greater. Thereby, when the temperature is greater than a predetermined temperature, by determining a gear speed to inhibit the heat release, it is possible to inhibit the energy loss.

A resistance value is calculated from a current value of a current supplied to a thermistor (not shown) disposed in the coils (not shown) of the stator MGa and a voltage value of a voltage applied on the thermistor, then, a temperature is determined by searching a table denoting the relationship between the resistance value and the temperature stored in the memory 21b, and the temperature is detected as the temperature of the motor MG. The detection of the temperature is equivalent to the temperature detection unit 21a2 in the present invention.

FIGS. 3(a) and 3(b) illustrate examples of maps of the calorific value of the motor MG with respect to the revolution speed and the driving force of the motor MG travelling at the fourth gear speed. The horizontal axis denotes the revolution speed, and the vertical axis denotes the driving force. As the driving force is greater than zero, it denotes the power-running state, and as the driving force is smaller than zero, it denotes the regenerative state.

Figure 3:
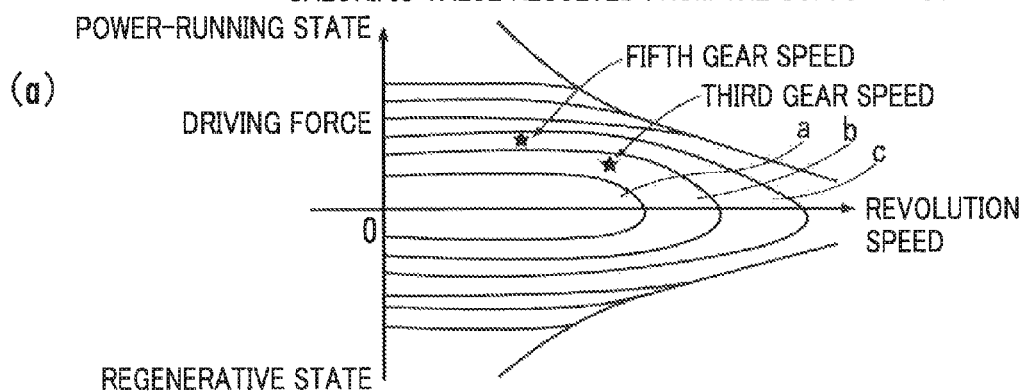
FIG. 3 is a diagram illustrating characteristic examples of a calorific value of the motor MG with respect to the revolution speed and the driving force of the motor MG, (a) representing a case where the third gear speed has a smaller calorific value than the fifth gear speed, and (b) representing a case where the fifth gear speed has a smaller calorific value than the third gear speed.
Figure 3:
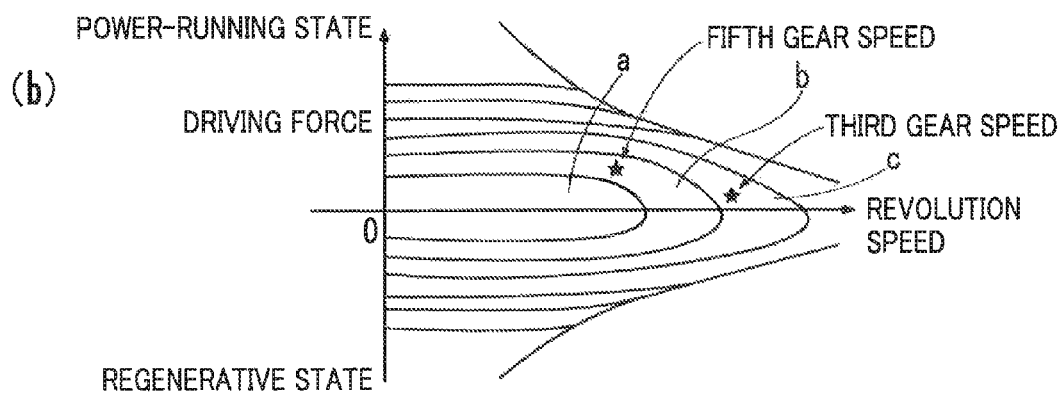

The three regions a, b and c illustrated in FIG. 3 denote the distribution of the calorific value of the motor MG. In the same region, the calorific value of the motor MG is equivalent. Equivalent calorific value does not mean that the calorific value has to be equal; it is acceptable that the calorific value is deemed as being equivalent if there is no problem occurred when treated as being equal. Therefore, the three regions a, b and c correspond to the calorific value groups in the present invention. The calorific value is small as both the revolution speed and the driving force are low; however, if at least one of the both increases, the calorific value increases. The region a has the smallest calorific value, and the calorific value becomes greater as the region leaves away from the region a. The number of the regions is not limited to three; it is acceptable to split the regions where necessary according to characteristics of the calorific value of the motor MG with respect to the revolution speed and the driving force of the motor MG.

The calorific value of the motor MG based on the revolution speed and the driving force of the motor MG is determined by the characteristics of the motor MG, and is stored in the memory 21b of the ECU 21 as a table.

The determination method for the revolution speed and the driving force of the motor MG is the same as the selection of a gear speed of the pre-shift according to the efficiency of the motor MG illustrated in FIGS. 2(a) to 2(c), thereby, the description thereof is omitted.

FIG. 3(a) illustrates an example in which the third gear speed has a calorific value smaller than the fifth gear speed. The calorific value at the third gear speed is denoted by the region b, and the calorific value at the fifth gear speed is denoted by the region c. In this case, the control unit 21a1 performs the pre-shift to select the third gear speed having a smaller calorific value.

FIG. 3(b) illustrates an example in which the fifth gear speed has a calorific value smaller than the third gear speed. The calorific value at the third gear speed is denoted by the region c, and the calorific value at the fifth gear speed is denoted by the region b. In this case, the control unit 21a1 performs the pre-shift to select the fifth gear speed having a smaller calorific value.

Similar to the selection of a gear speed of the pre-shift according to the efficiency of the motor MG, as the calorific value of each gear speed is present in the same region, by selecting a gear speed of the pre-shift via the above-mentioned selection method based on the required driving force, it is possible to prevent the driving force from being deteriorated while reducing the energy loss of the motor MG.

As mentioned above, by selecting a gear speed of the pre-shift according to the calorific value of the motor MG, it is possible to inhibit the decrement of the driving force of the motor MG.

In the present embodiment, the gear speed of the pre-shift is selected according the driving force in a case where the driving force is requested by the vehicle; in a case where the temperature of the motor MG is equal to or greater than the predetermined temperature, the gear speed of the pre-shift is selected according to the calorific value resulted from the copper loss of the motor MG; and in a case other than the mentioned cases, the gear speed of the pre-shift is selected according to the efficiency of the motor MG. Accordingly, it is possible to output the required driving force according to the necessity of the driver and improve the fuel efficiency.

Hereinafter, the control process of the transmission performed by the CPU 21a of the ECU 21 in the present embodiment will be described.

In the present embodiment, the CPU 21a functions as the control unit in the present invention.

Figure 4:
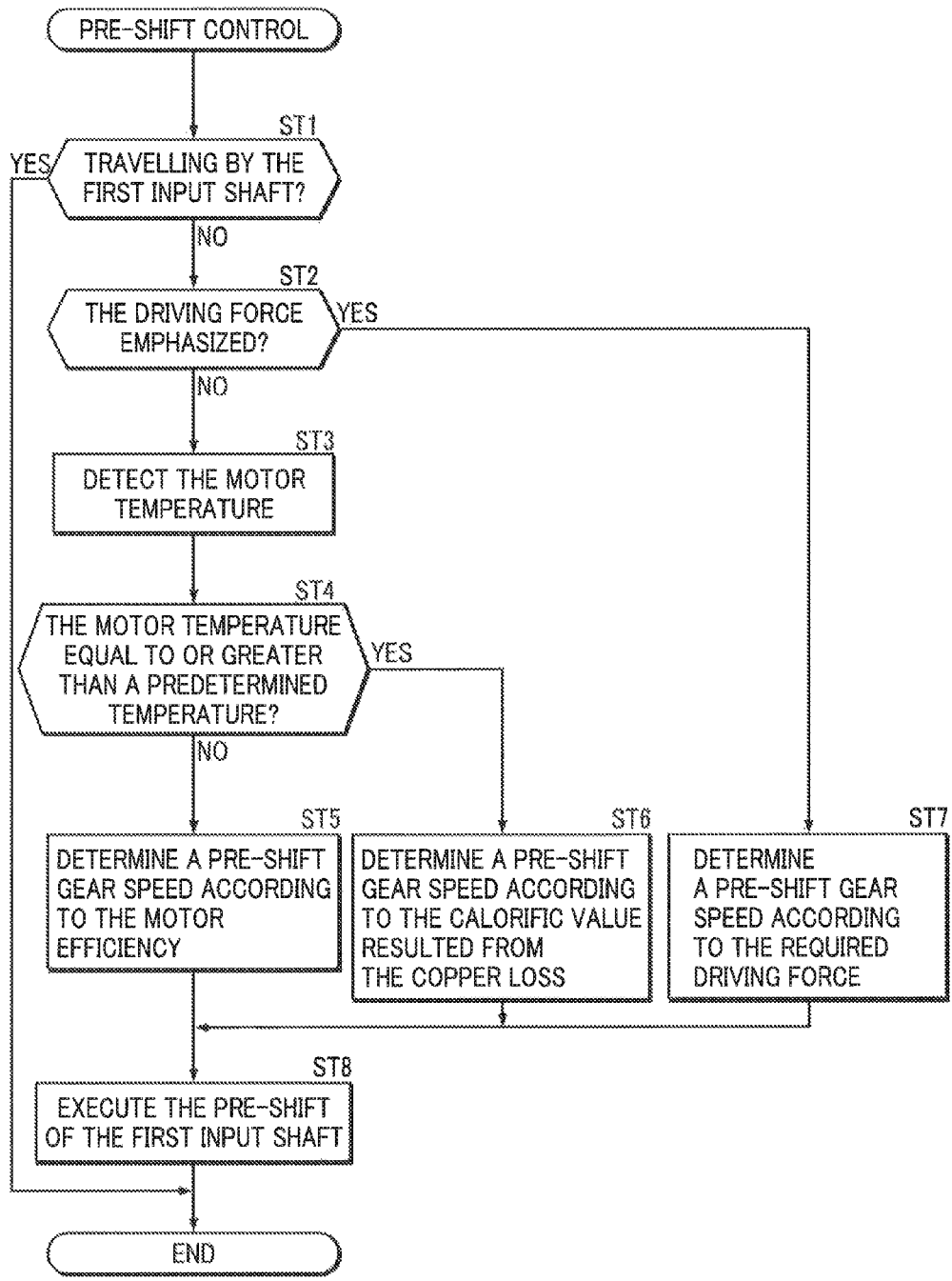
FIG. 4 is a flow chart illustrating a processing order of a pre-shift control in a transmission control performed by an ECU 21 in FIG. 1.

FIG. 4 is a flow chart illustrating a pre-shift control process performed by the CPU 21a functioning as the control unit of the present invention. The control processing program illustrated by the flow chart is called out and performed every predetermined time (for example, every 10 msec).

In the first step ST1, whether or not the vehicle is travelling by the first input shaft 34 is determined. The pre-shift control of the present invention is for controlling the pre-shift of the first input shaft 34 coupled with the motor MG in the travelling to input the driving force of the engine ENG to the second input shaft 35; therefore, if the vehicle is travelling by the first input shaft 34, it is out of the control subject. Step ST1 corresponds to the determination step in the present invention.

If it is determined that the vehicle is travelling by the first input shaft 34 (the determination result of step ST1 is YES), the control process is terminated; if it is determined that the vehicle is not travelling by the first input shaft 34 (the determination result of step ST1 is NO), the control process proceeds to step ST2.

In step ST2, whether or not the driving force is emphasized is determined. The determination of whether or not the driving force is emphasized is performed by determining whether a manipulated amount of the accelerator pedal (required driving force) is equal to or greater than a predetermined value. The predetermined value is set according to a manipulated amount of the accelerator pedal which is considered to be stepped down by the driver when the driver is going to make acceleration. The predetermined value is stored preliminarily in the memory 21b. It is acceptable to vary the predetermined value according to the travelling velocity of the vehicle.

Whether or not the driving force is emphasized may be determined in such a way that whether or not a sport travelling mode is preset and it is determined to emphasize the driving force as the sport travelling mode is switched on. The sport travelling mode refers to such a travelling mode that the revolution speed of the engine ENG is kept at a high speed to improve the travelling performance so as to react quickly to the acceleration or deceleration request according to the manipulations on the accelerator pedal. When the driver switches on the sport travelling mode, it is highly probable that the driving force is emphasized more than the energy efficiency; therefore, it is possible to answer the request of the driver by changing the transmission gears according to the required driving force. The setting of the sport travelling mode (the on/off state thereof) is memorized in the memory 21b. The two determination methods mentioned in the above may be performed simultaneously to determine whether or not the driving force is emphasized.

Step ST2 corresponds to the request determination unit 21a3 and the request determination step in the present invention. The process of setting the sport travelling mode in the step ST2 corresponds to the setting unit 21a4 in the present invention.

If it is determined that the driving force is not emphasized in the determination of step ST2 (the determination result of step ST2 is NO), the control process proceeds to step ST3. In step ST3, the detection of a temperature of the motor MG is performed according to the above-mentioned method. The step ST3 corresponds to the temperature detection unit 21a2 and the temperature determination step in the present invention.

Thereafter, the control process proceeds to step ST4 where whether the detection temperature of the motor MG in step ST3 is not smaller than a predetermined temperature is determined. The predetermined temperature is set to such a temperature that the decrement of the driving force of the motor MG resulted from the heat release can not be allowed. The step ST4 corresponds to the temperature detection step in the present invention.

If the determination result of step ST4 is NO, the control process proceeds to step ST5 where a gear speed of the pre-shift is determined according to the efficiency of the motor MG by using the above-mentioned method. If the determination result of step ST4 is YES, the control process proceeds to step ST6 where a gear speed of the pre-shift is determined according to the calorific value resulted from the copper loss by using the above-mentioned method.

If it is determined that the driving force is emphasized in the determination of step ST2 (the determination result of step ST2 is YES), the control process proceeds to step ST7 where a gear speed of the pre-shift is determined according to the required driving force by using the above-mentioned method.

After the process of step ST5, step ST6 or step ST7 is finished, the control process proceeds to step ST8 where the pre-shift of the first input shaft is performed to select the determined gear speed, and thereafter, the control process is terminated. Step ST5 and step ST8 correspond to the ratio selection step in the present invention. Step is 5 ST6 and step ST8 correspond to the calorific value selection step in the present invention. Step ST7 and step ST8 correspond to the driving force selection step in the present invention. The processing in steps ST1 and ST5 corresponds to the first aspect or the fifth aspect of the present invention; the processing in steps ST1 and ST6 corresponds to the second aspect or the sixth aspect of the present invention; the processing in steps ST1, ST3, ST4 ST5 and ST6 corresponds to the third aspect of the present invention; and the processing of all steps in FIG. 4 corresponds to the fourth aspect or the seventh aspect of the present invention.

As mentioned above, the CPU 21a serving as the control unit performs the determination of whether or not it is travelling without using the first input shaft (step ST1), performs the determination of whether or not the driving force is emphasized (step ST2); if the driving force is emphasized, performs the selection of a gear speed of the pre-shift according to the required driving force (step ST7), if the driving force is not emphasized, performs the detection of the temperature of the motor MG (step ST3). If the temperature of the motor MG is not lower than the predetermined temperature, the selection of a gear speed of the pre-shift is performed according to the calorific value resulted from the copper loss of the motor MG (step ST6); if the temperature is less than the predetermined temperature, the selection of a gear speed of the pre-shift is performed according to the efficiency of the motor MG (step ST5). After the gear speed of the pre-shift is determined according to the respect condition, the pre-shift of the first input shaft is performed actually (step ST8).

According thereto, in the pre-shift of during the travelling by the input shaft coupled with the internal combustion engine only, it is possible to select a transmission gear so as to reduce the energy loss of the motor.

In the present embodiment, the determination of whether or not the driving force is emphasized is performed in step ST2; however, it is acceptable that the determination is not performed (corresponding to the third aspect of the present invention). According thereto, the effect of the present invention, namely the selection of a transmission gear so as to reduce the energy loss of the motor MG can be achieved. Similarly, the determination of whether or not the temperature of the motor MG is not lower than the predetermined temperature is performed in step ST4; however, it is acceptable to perform only the processing of selecting a gear speed of the pre-shift according to the efficiency of the motor MG in step ST5 (corresponding to first or the fifth aspect of the present invention), or only the processing of selecting a gear speed of the pre-shift according to the calorific value resulted from the copper loss of the motor MG in step ST6 (corresponding to the second or the sixth aspect of the present invention) without performing such determination. In either case, since the transmission gear is selected on the basis of the travelling velocity and the required driving force of the motor MG so as to reduce the energy loss of the motor MG, it is possible to achieve the effect of the present invention as to reduce the energy loss of the motor MG.

INDUSTRIAL APPLICABILITY

As mentioned above, the present invention can be applied effectively to reduce an energy loss in a vehicle having an internal combustion engine and an electric motor.

The invention claimed is:

1. A transmission control device of a hybrid vehicle equipped with an internal combustion engine and an electric motor as a driving source, comprising:
a transmission configured to perform a gear-change on a driving force input from the internal combustion engine and the electric motor and output the changed driving force, and
a control unit configured to control the transmission,
the transmission is configured to include
a first input shaft which is input with the driving force from the electric motor and the driving force from the internal combustion engine via a first switching unit, and has at least two transmission gears;
a second input shaft which is input with the driving force from the internal combustion engine via a second switching unit and has at least one transmission gear;
a first selection unit configured to select a transmission gear of the first input shaft;
a second selection unit configured to select a transmission gear of the second input shaft; and
an output shaft coupled with the first input shaft or the second input shaft via the first selection unit or the second selection unit, and
the transmission is configured to perform the gear-change on the driving force input from the first input shaft or the second input shaft and output it from the output shaft through the selection of the transmission gear by the first selection unit or the second selection unit, respectively, under a condition that the first switching unit or the second switching unit is in a coupled state,
a plurality of ratios which are determined by characteristics of the electric motor according to a revolution speed and the driving force of the electric motor and obtained by dividing an output energy of the electric motor by an input energy thereof are set, and a plurality of ratio groups having the equivalent ratio among the plurality of ratios are prepared preliminarily,
under a condition that the first switching unit is in a decoupled state, the second switching unit is in a coupled state and a transmission gear is selected by the second selection unit to input the driving force from the internal combustion engine to the second input shaft, the control unit determines the ratio for each transmission gear of the first input shaft on the basis of a travelling speed and a required driving force of the vehicle, determines to which group among the plurality of ratio groups that each determined ratio is pertained, and selects a transmission gear of the first input shaft corresponding to a ratio group having the highest ratio among the determined ratio groups to which the determined ratio is pertained via the first selection unit.

2. The transmission control device according to claim 1, wherein
under a condition that the transmission gear of the first input shaft corresponding to the ratio group having the highest ratio among the determined ratio groups to which the determined ratio is pertained is present in plural number, the control unit selects a transmission gear of the first input shaft via the first selection unit according to the required driving force.

3. A transmission control device of a hybrid vehicle equipped with an internal combustion engine and an electric motor as a driving source, comprising:
a transmission configured to perform a gear-change on a driving force input from the internal combustion engine and the electric motor and output the changed driving force, and
a control unit configured to control the transmission,
the transmission is configured to include
a first input shaft which is input with the driving force from the electric motor and the driving force from the internal combustion engine via a first switching unit, and has at least two transmission gears;
a second input shaft which is input with the driving force from the internal combustion engine via a second switching unit and has at least one transmission gear;
a first selection unit configured to select a transmission gear of the first input shaft;
a second selection unit configured to select a transmission gear of the second input shaft; and
an output shaft coupled with the first input shaft or the second input shaft via the first selection unit or the second selection unit, and
the transmission is configured to perform the gear-change on the driving force input from the first input shaft or the second input shaft and output it from the output shaft through the selection of the transmission gear by the first selection unit or the second selection unit, respectively, under a condition that the first switching unit or the second switching unit is in a coupled state,
a plurality of calorific values of the electric motor which are determined by characteristics of the electric motor according to a revolution speed and the driving force of the electric motor are set, and a plurality of calorific value groups having the equivalent calorific value among the plurality of calorific values are prepared preliminarily,
under a condition that the first switching unit is in a decoupled state, the second switching unit is in a coupled state and a transmission gear is selected by the second selection unit to input the driving force from the internal combustion engine to the second input shaft, the control unit determines the calorific value for each transmission gear of the first input shaft on the basis of a travelling speed and a required driving force of the vehicle, determines to which group among the plurality of calorific value groups that each determined calorific value is pertained, and selects a transmission gear of the first input shaft corresponding to a calorific value group having the smallest calorific value among the determined calorific value groups to which the determined calorific value is pertained via the first selection unit.

4. The transmission control device according to claim 3, wherein
under a condition that the transmission gear of the first input shaft corresponding to the calorific value group having the smallest calorific value among the determined calorific value groups to which the determined calorific value is pertained is present in plural number, the control unit selects a transmission gear of the first input shaft via the first selection unit according to the required driving force.

5. A transmission control device of a hybrid vehicle equipped with an internal combustion engine and an electric motor as a driving source, comprising:
a transmission configured to perform a gear-change on a driving force input from the internal combustion engine and the electric motor and output the changed driving force,
a control unit configured to control the transmission, and
a temperature detection unit configured to detect a temperature of the electric motor,
the transmission is configured to include
a first input shaft which is input with the driving force from the electric motor and the driving force from the internal combustion engine via a first switching unit, and has at least two transmission gears;
a second input shaft which is input with the driving force from the internal combustion engine via a second switching unit and has at least one transmission gear;
a first selection unit configured to select a transmission gear of the first input shaft;
a second selection unit configured to select a transmission gear of the second input shaft; and
an output shaft coupled with the first input shaft or the second input shaft via the first selection unit or the second selection unit, and
the transmission is configured to perform the gear-change on the driving force input from the first input shaft or the second input shaft and output it from the output shaft through the selection of the transmission gear by the first selection unit or the second selection unit, respectively, under a condition that the first switching unit or the second switching unit is in a coupled state,
a plurality of ratios which are determined by characteristics of the electric motor according to a revolution speed and the driving force of the electric motor and obtained by dividing an output energy of the electric motor by an input energy thereof are set, and a plurality of ratio groups having the equivalent ratio among the plurality of ratios are prepared preliminarily, and
a plurality of calorific values of the electric motor which are determined by characteristics of the electric motor according to a revolution speed and the driving force of the electric motor are set, and a plurality of calorific value groups having the equivalent calorific value among the plurality of calorific values are prepared preliminarily,
under a condition that the first switching unit is in a decoupled state, the second switching unit is in a coupled state and a transmission gear is selected by the second selection unit to input the driving force from the internal combustion engine to the second input shaft,
if the temperature detected by the temperature detection unit is equal to or greater than a predetermined temperature, the control unit determines the calorific value for each transmission gear of the first input shaft on the basis of a travelling speed and a required driving force of the vehicle, determines to which group among the plurality of calorific value groups that each determined calorific value is pertained, and selects a transmission gear of the first input shaft corresponding to a calorific value group having the smallest calorific value among the determined calorific value groups to which the determined calorific value is pertained via the first selection unit;
if the temperature detected by the temperature detection unit is less than the predetermined temperature, the control unit determines the ratio for each transmission gear of the first input shaft on the basis of the travelling speed and the required driving force of the vehicle, determines to which group among the plurality of ratio groups that each determined ratio is pertained, and selects a transmission gear of the first input shaft corresponding to a ratio group having the highest ratio among the determined ratio groups to which the determined ratio is pertained via the first selection unit.

6. The transmission control device according to claim 5, wherein
under a condition that the transmission gear of the first input shaft corresponding to the ratio group having the highest ratio among the determined ratio groups to which the determined ratio is pertained is present in plural number, the control unit selects a transmission gear of the first input shaft via the first selection unit according to the required driving force.

7. The transmission control device according to claim 5, wherein
under a condition that the transmission gear of the first input shaft corresponding to the calorific value group having the smallest calorific value among the determined calorific value groups to which the determined calorific value is pertained is present in plural number, the control unit selects a transmission gear of the first input shaft via the first selection unit according to the required driving force.

8. A transmission control device of a hybrid vehicle equipped with an internal combustion engine and an electric motor as a driving source, comprising:
a transmission configured to perform a gear-change on a driving force input from the internal combustion engine and the electric motor and output the changed driving force,
a control unit configured to control the transmission,
a temperature detection unit configured to detect a temperature of the electric motor, and
a request determination unit configured to determine whether or not the driving force is requested by the vehicle,
the transmission is configured to include
a first input shaft which is input with the driving force from the electric motor and the driving force from the internal combustion engine via a first switching unit, and has at least two transmission gears;
a second input shaft which is input with the driving force from the internal combustion engine via a second switching unit and has at least one transmission gear;
a first selection unit configured to select a transmission gear of the first input shaft;
a second selection unit configured to select a transmission gear of the second input shaft; and
an output shaft coupled with the first input shaft or the second input shaft via the first selection unit or the second selection unit, and
the transmission is configured to perform the gear-change on the driving force input from the first input shaft or the second input shaft and output it from the output shaft through the selection of the transmission gear by the first selection unit or the second selection unit, respectively, under a condition that the first switching unit or the second switching unit is in a coupled state,
a plurality of ratios which are determined by characteristics of the electric motor according to a revolution speed and the driving force of the electric motor and obtained by dividing an output energy of the electric motor by an input energy thereof are set, and a plurality of ratio groups having the equivalent ratio among the plurality of ratios are prepared preliminarily, and a plurality of calorific values of the electric motor which are determined by characteristics of the electric motor according to a revolution speed and the driving force of the electric motor are set, and a plurality of calorific value groups having the equivalent calorific value among the plurality of calorific values are prepared preliminarily, under a condition that the first switching unit is in a decoupled state, the second switching unit is in a coupled state and a transmission gear is selected by the second selection unit to input the driving force from the internal combustion engine to the second input shaft, if it is determined by the request determination unit that the driving force is requested, the control unit selects a transmission gear for the first input shaft via the first selection unit according to the required driving force, if the temperature detected by the temperature detection unit is equal to or greater than a predetermined temperature, the control unit determines the calorific value for each transmission gear of the first input shaft on the basis of a travelling speed and a required driving force of the vehicle, determines to which group among the plurality of calorific value groups that each determined calorific value is pertained, and selects a transmission gear of the first input shaft corresponding to a calorific value group having the smallest calorific value among the determined calorific value groups to which the determined calorific value is pertained via the first selection unit;

if the temperature detected by the temperature detection unit is less than the predetermined temperature, the control unit determines the ratio for each transmission gear of the first input shaft on the basis of the travelling speed and the required driving force of the vehicle, determines to which group among the plurality of ratio groups that each determined ratio is pertained, and selects a transmission gear of the first input shaft corresponding to a ratio group having the highest ratio among the determined ratio groups to which the determined ratio is pertained via the first selection unit.

9. The transmission control device according to claim 8, wherein
under a condition that the transmission gear of the first input shaft corresponding to the ratio group having the highest ratio among the determined ratio groups to which the determined ratio is pertained is present in plural number, the control unit selects a transmission gear of the first input shaft via the first selection unit according to the required driving force.

10. The transmission control device according to claim 8, wherein
under a condition that the transmission gear of the first input shaft corresponding to the calorific value group having the smallest calorific value among the determined calorific value groups to which the determined calorific value is pertained is present in plural number, the control unit selects a transmission gear of the first input shaft via the first selection unit according to the required driving force.

11. The transmission control device according to claim 8, wherein
the request determination unit determines that the driving force is requested if the required driving force is equal to or greater than a predetermined value.

12. The transmission control device according to claim 8 further includes a setting unit configured to set whether or not to emphasize the driving force,
the request determination unit determines that the driving force is requested if the setting unit is set to emphasize the driving force.

13. A transmission control method for a hybrid vehicle equipped with an internal combustion engine and an electric motor as a driving source,
the transmission being configured to include
a first input shaft which is input with the driving force from the electric motor and the driving force from the internal combustion engine via a first switching unit, and has at least two transmission gears;
a second input shaft which is input with the driving force from the internal combustion engine via a second switching unit and has at least one transmission gear;
a first selection unit configured to select a transmission gear of the first input shaft;
a second selection unit configured to select a transmission gear of the second input shaft; and
an output shaft coupled with the first input shaft or the second input shaft via the first selection unit or the second selection unit, and
the transmission being configured to perform the gear-change on the driving force input from the first input shaft or the second input shaft and output it from the output shaft through the selection of the transmission gear by the first selection unit or the second selection unit, respectively, under a condition that the first switching unit or the second switching unit is in a coupled state,
a plurality of ratios which are determined by characteristics of the electric motor according to a revolution speed and the driving force of the electric motor and obtained by dividing an output energy of the electric motor by an input energy thereof being set, and a plurality of ratio groups having the equivalent ratio among the plurality of ratios being prepared preliminarily,
the transmission control method including
a determination step of determining whether or not a transmission gear is selected by the second selection unit to input the driving force from the internal combustion engine to the second input shaft under a condition that the first switching unit is in a decoupled state and the second switching unit is in the coupled state, and
a ratio selection step of determining the ratio for each transmission gear of the first input shaft on the basis of a travelling speed and a required driving force of the vehicle, determining to which group among the plurality of ratio groups that each determined ratio is pertained, and selecting a transmission gear of the first input shaft corresponding to a ratio group having the highest ratio among the determined ratio groups to which the determined ratio is pertained via the first selection unit if the determination result in the determination step is affirmative.

14. A transmission control method for a hybrid vehicle equipped with an internal combustion engine and an electric motor as a driving source,
the transmission being configured to include
a first input shaft which is input with the driving force from the electric motor and the driving force from the internal combustion engine via a first switching unit, and has at least two transmission gears;

a second input shaft which is input with the driving force from the internal combustion engine via a second switching unit and has at least one transmission gear;
a first selection unit configured to select a transmission gear of the first input shaft;
a second selection unit configured to select a transmission gear of the second input shaft; and
an output shaft coupled with the first input shaft or the second input shaft via the first selection unit or the second selection unit, and
the transmission being configured to perform the gear-change on the driving force input from the first input shaft or the second input shaft and output it from the output shaft through the selection of the transmission gear by the first selection unit or the second selection unit, respectively, under a condition that the first switching unit or the second switching unit is in a coupled state,
a plurality of calorific values of the electric motor which are determined by characteristics of the electric motor according to a revolution speed and the driving force of the electric motor being set, and a plurality of calorific value groups having the equivalent calorific value among the plurality of calorific values being prepared preliminarily,
the transmission control method including
a determination step of determining whether or not a transmission gear is selected by the second selection unit to input the driving force from the internal combustion engine to the second input shaft under a condition that the first switching unit is in a decoupled state and the second switching unit is in the coupled state, and
a calorific value selection step of determining the calorific value for each transmission gear of the first input shaft on the basis of a travelling speed and a required driving force of the vehicle, determining to which group among the plurality of calorific value groups that each determined calorific value is pertained, and selecting a transmission gear of the first input shaft corresponding to a calorific value group having the smallest calorific value among the determined calorific value groups to which the determined calorific value is pertained via the first selection unit if the determination result in the determination step is affirmative.

15. A transmission control method for a hybrid vehicle equipped with an internal combustion engine and an electric motor as a driving source,
the transmission being configured to include
a first input shaft which is input with the driving force from the electric motor and the driving force from the internal combustion engine via a first switching unit, and has at least two transmission gears;
a second input shaft which is input with the driving force from the internal combustion engine via a second switching unit and has at least one transmission gear;
a first selection unit configured to select a transmission gear of the first input shaft;
a second selection unit configured to select a transmission gear of the second input shaft; and
an output shaft coupled with the first input shaft or the second input shaft via the first selection unit or the second selection unit, and
the transmission being configured to perform the gear-change on the driving force input from the first input shaft or the second input shaft and output it from the output shaft through the selection of the transmission gear by the first selection unit or the second selection unit, respectively, under a condition that the first switching unit or the second switching unit is in a coupled state,
a plurality of ratios which are determined by characteristics of the electric motor according to a revolution speed and the driving force of the electric motor and obtained by dividing an output energy of the electric motor by an input energy thereof being set, and a plurality of ratio groups having the equivalent ratio among the plurality of ratios being prepared preliminarily,
a plurality of calorific values of the electric motor which are determined by characteristics of the electric motor according to a revolution speed and the driving force of the electric motor being set, and a plurality of calorific value groups having the equivalent calorific value among the plurality of calorific values being prepared preliminarily,
the transmission control method including
a determination step of determining whether or not a transmission gear is selected by the second selection unit to input the driving force from the internal combustion engine to the second input shaft under a condition that the first switching unit is in a decoupled state and the second switching unit is in the coupled state,
a request determination step of determining whether or not the driving force is requested by the vehicle if the determination result in the determination step is affirmative,
a driving force selection step of selecting a transmission gear of the first input shaft via the first selection unit according to the required driving force if the determination result in the request determination step is affirmative,
a temperature detection step of detecting a temperature of the electric motor if the determination result in the request determination step is negative,
a temperature determination step of determining whether or not the temperature is equal to or greater than a predetermined temperature,
a calorific value selection step of determining the calorific value for each transmission gear of the first input shaft on the basis of a travelling speed and a required driving force, determining to which group among the plurality of calorific value groups that each determined calorific value is pertained, and selecting a transmission gear of the first input shaft corresponding to a calorific value group having the smallest calorific value among the determined calorific value groups to which the determined calorific value is pertained via the first selection unit if the determination result in the temperature determination step is affirmative, and
a ratio selection step of determining the ratio for each transmission gear of the first input shaft on the basis of a travelling speed and a required driving force of the vehicle, determining to which group among the plurality of ratio groups that each determined ratio is pertained, and selecting a transmission gear of the first input shaft corresponding to a ratio group having the highest ratio among the determined ratio groups to which the determined ratio is pertained via the first selection unit if the determination result in the temperature determination step is negative.

\* \* \* \* \*